US012585297B2

(12) United States Patent
Lee et al.

(10) Patent No.: US 12,585,297 B2
(45) Date of Patent: Mar. 24, 2026

(54) LDO REGULATOR CAPABLE OF BEING OPERATED AT LOW VOLTAGE AND SEMICONDUCTOR DEVICE INCLUDING THE SAME

(71) Applicant: SAMSUNG ELECTRONICS CO., LTD., Suwon-si (KR)

(72) Inventors: Hyung-Min Lee, Seoul (KR); Hyunjun Park, Seoul (KR); Woojoong Jung, Seoul (KR)

(73) Assignees: SAMSUNG ELECTRONICS CO., LTD., Suwon-si (KR); Korea University Research and Business Foundation, Seoul (KR)

( * ) Notice: Subject to any disclaimer, the term of this patent is extended or adjusted under 35 U.S.C. 154(b) by 343 days.

(21) Appl. No.: 18/342,415

(22) Filed: Jun. 27, 2023

(65) Prior Publication Data

US 2024/0053783 A1 Feb. 15, 2024

(30) Foreign Application Priority Data

Aug. 11, 2022 (KR) ........................ 10-2022-0100499

(51) Int. Cl.
*G05F 1/575* (2006.01)
*G05F 1/563* (2006.01)
(Continued)

(52) U.S. Cl.
CPC .............. *G05F 1/575* (2013.01); *G05F 1/563* (2013.01); *G05F 1/565* (2013.01); *G05F 3/247* (2013.01)

(58) Field of Classification Search
CPC .......... G05F 3/247; G05F 1/462; G05F 1/468; G05F 1/562; G05F 1/563; G05F 1/59;
(Continued)

(56) References Cited

U.S. PATENT DOCUMENTS 7,948,720 B2 5/2011 Mok et al.
9,454,166 B2 9/2016 Liu
(Continued)

FOREIGN PATENT DOCUMENTS

CN 107608435 B * 8/2018
EP 3916511 5/2021
(Continued)

OTHER PUBLICATIONS

Huang, et al., "An Analog-Assisted Tri-Loop Digital Low-Dropout Regulator," IEEE Journal of Solid-State Circuits, vol. 53, No. 1, Jan. 2018, pp. 20-34. (Year: 2018).*
(Continued)

*Primary Examiner* — Alex Torres-Rivera
*Assistant Examiner* — Ularislao Cordova
(74) *Attorney, Agent, or Firm* — Morgan, Lewis & Bockius LLP

(57) ABSTRACT

A low dropout (LDO) regulator includes: one or more power transistors configured to dispose between an input node and an output node, wherein the input node is a node to which an input voltage is applied and the output node is a node from which an output voltage is output; a voltage comparing unit configured to generate a comparative signal based on a difference between the output voltage and a first reference voltage; a digital control unit configured to generate a control signal for gating of the one or more power transistors in response to the comparative signal; and a gate driving unit configured to output a gating signal for the one or more power transistors in response to the control signal, wherein the gating signal is corresponding to one of the input voltage and a negative of the input voltage.

20 Claims, 18 Drawing Sheets

(51) Int. Cl.
*G05F 1/565* (2006.01)
*G05F 3/24* (2006.01)

(58) Field of Classification Search
CPC .. G05F 1/56; H03K 17/04106; H03K 17/063; H03K 17/0412; H02M 1/08
See application file for complete search history.

(56) References Cited

U.S. PATENT DOCUMENTS

| | | | |
|---|---|---|---|
| 10,185,338 | B1 | 1/2019 | Lahiri et al. |
| 10,423,176 | B2 | 9/2019 | Pan et al. |
| 10,444,779 | B2 | 10/2019 | Lin et al. |
| 10,873,257 | B2 | 12/2020 | Harjani et al. |
| 2021/0240142 | A1 | 8/2021 | Bang et al. |

FOREIGN PATENT DOCUMENTS

| | | |
|---|---|---|
| KR | 10-2312388 | 10/2021 |
| WO | 2021113563 | 6/2021 |

OTHER PUBLICATIONS

K. I. Hwu and Y. T. Yau, "A novel gate driver with output having positive input voltage and negative double input voltage," 2012 Twenty-Seventh Annual IEEE Applied Power Electronics Conference and Exposition (APEC), Orlando, FL, USA, 2012, pp. 1716-1719, doi: 10.1109/APEC.2012.6166053. (Year: 2012).*

Woo, et al., "A 0.35V 90nA Quiescent Current Output-Capacitor-Less NMOS Low-Dropout Regulator Using a Coarse-Fine Charge-Pump Circuit", IEEE Transactions on Circuits and Systems-II: Express Briefs, vol. 67, No. 12, Dec. 2020, pp. 3118-3122.

Huang, et al., "An Analog-Assisted Tri-Loop Digital Low-Dropout Regulator," IEEE Journal of Solid-State Circuits, vol. 53, No. 1, Jan. 2018, pp. 20-34.

Lu, et al., "A Distributed Power Delivery Grid Based on Analog-Assisted Digital LDOs With Cooperative Regulation and IR-Drop Reduction", IEEE Transactions on Circuits and Systems—I: Regular Papers, vol. 67, No. 8, Aug. 2020, pp. 2859-2871.

Ma, et.al, "An NMOS Digital LDO With NAND-Based Analog-Assisted Loop in 28-nm CMOS," IEEE Transactions on Circuits and Systems-I: Regular Papers, vol. 67, No. 11, Nov. 2020, pp. 4041-4052.

Akram, et al., "Fast Transient Fully Standard-Cell-Based All Digital Low-Dropout Regulator With 99.97% Current Efficiency," IEEE Transactions on Power Electronics, vol. 33, No. 9, Sep. 2018, pp. 8011-8019, Sep. 2018.

Jain, et al., "A 280mV-to-1.2V Wide-Operating-Range IA-32 Processor in 32nm CMOS", in Solid Solid-State Circuits Conference Digest of Technical Papers (ISSCC), 2012 IEEE International, Feb. 2012, pp. 66-68.

European Search Report dated Jan. 25, 2024 in corresponding European Patent Application 23182484.8, 13 pages.

Huang, et al., "An Analog-Assisted Tri-Loop Digital Low-Dropout Regulator", in IEEE Journal of Solid State Circuits, vol. 53, No. 1, Jan. 2018, pp. 20-34.

Park, et al., "A 0.3V-Vin, 0.015ps-FoM Fully Integrated Analog-Assisted Digital LDO With Dual-Negative Gate Control and Adaptive Transient Recovery Path", in IEEE Transactions on Power Electronics, vol. 38, No. 1, Jan. 2023, pp. 85-89.

Tan, et al., "A Fully-On-Chip Analog Low-Dropout Regulator With Negative Charge Pump for Low-Voltage Applications", in IEEE Transactions on Circuits and Systems-II: Express Briefs, vol. 66, No. 8, Aug. 2019, pp. 1361-1365.

* cited by examiner

LDO REGULATOR CAPABLE OF BEING OPERATED AT LOW VOLTAGE AND SEMICONDUCTOR DEVICE INCLUDING THE SAME

CROSS-REFERENCE TO RELATED APPLICATION

This application claims priority under 35 U.S.C. § 119 to Korean Patent Application No. 10-2022-0100499, filed on Aug. 11, 2022, in the Korean Intellectual Property Office, the disclosure of which is incorporated by reference herein in its entirety.

BACKGROUND

The present disclosure relates to a low dropout (LDO) regulator and a semiconductor device including the same, and more particularly, to an LDO regulator which may be operated at a low voltage and a semiconductor device including the same.

A low dropout (LDO) regulator is a type of voltage regulator that applies a constant power voltage to an integrated circuit. Particularly, the LDO is a linear regulator that is effective for realizing high power efficiency when a potential difference between an input voltage and an output voltage is relatively small. Recently, as semiconductor devices become highly integrated or portable, there is a need for using low-voltage driving to reduce power consumption.

SUMMARY

The present disclosure describes a low dropout (LDO) regulator which may be operated at a low voltage and a semiconductor device including the same.

According to an aspect of the present disclosure, a low dropout (LDO) regulator comprises one or more power transistors configured to dispose an input node and an output node, wherein the input node is a node to which an input voltage is applied and to the output node is a node from which t an output voltage is output; a voltage comparing unit configured to generate a comparative signal based on a difference between the output voltage and a first reference voltage; a digital control unit configured to generate a control signal for gating of the one or more power transistors in response to the comparative signal; and a gate driving unit configured to output a gating signal for the one or more power transistors in response to the control signal, wherein the gating signal is corresponding to one of the input voltage and a negative of the input voltage.

According to an aspect of the present disclosure, an LDO regulator includes a coarse loop for regulating an output voltage of an output node within a first voltage range by controlling gating of one or more coarse power transistors; and a fine loop for regulating the output voltage within a second voltage range narrower than the first voltage range by controlling gating of one or more fine power transistors, wherein each of the one or more coarse power transistors and the one or more fine power transistors is gated by a gating signal, wherein the gating signal is corresponding to one of an input voltage and a negative of the input voltage.

According to an aspect of the present disclosure, a method includes generating an output voltage using one or more power transistors of a low dropout (LDO) regulator, wherein the output voltage is based on an input voltage of the one or more power transistors; determining a difference between the output voltage and a reference voltage; and generating a gating signal for the one or more power transistors based on the difference between the output voltage and a reference voltage, wherein the gating signal comprises the input voltage or a negative of the input voltage.

According to another embodiment of the present disclosure, there is provided a semiconductor device including the LDO regulator described above.

BRIEF DESCRIPTION OF THE FIGURES

The above and other objects and features of the present disclosure will become apparent by describing embodiments thereof with reference to the accompanying drawings. The present disclosure describes a low dropout (LDO) regulator which may be operated at a low voltage and a semiconductor device including the same.

DETAILED DESCRIPTION

The present disclosure relates to a low dropout (LDO) regulator, and a semiconductor device including the LDO regulator. An LDO regulator is a voltage regulator that can regulate output voltage when the supply voltage is close to the output voltage. In some embodiments, the LDO regulators is a digital DC voltage regulator.

Embodiments of the present disclosure include a LDO regulator that enables a faster transient response than conventional voltage regulator. Embodiments of the present disclosure can reduce or eliminate switching noise and enable smaller device size compared to conventional voltage regulators.

In some embodiments, an LDO regulator does not depend on a sampling frequency. In some embodiments, the LDO regulator is operated at a lower voltage than conventional voltage regulators by generating a negative gating voltage. Accordingly, embodiments of the disclosure include an LDO regulator with high efficiency, low power, and high stability while reducing transient response, ripple and power supply rejection ratio (PSRR).

Figure 1:
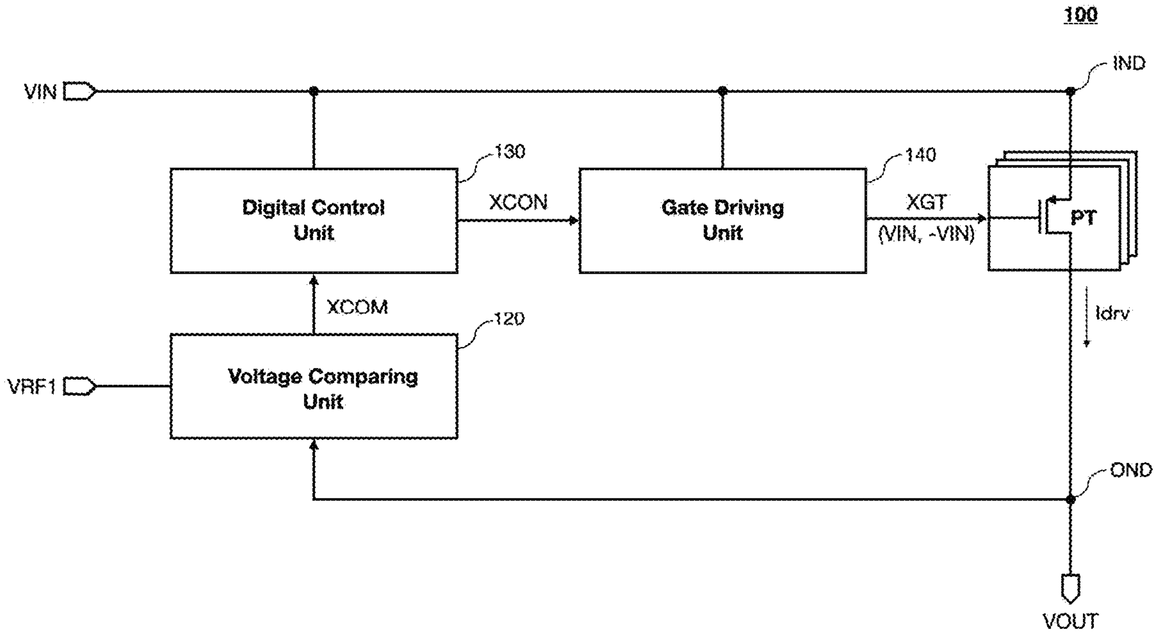
FIG. 1 illustrates a low dropout (LDO) regulator according to an embodiment of the present disclosure.

FIG. 1 illustrates an LDO regulator 100 according to an embodiment of the present disclosure.

Referring to FIG. 1, the LDO regulator 100, according to an embodiment of the present disclosure, includes one or more power transistors PT, a voltage comparing unit 120, a digital control unit 130, and a gate driving unit 140.

The power transistors PT may be respectively connected between an input node IND, to which an input voltage VIN is applied, and an output node OND, from which an output voltage VOUT is output. The transistors PT may be p-type metal oxide semiconductor (PMOS) transistors.

A level of a driving current Idrv applied to the output node OND may vary based on the number powered-on of the power transistors PT. For example, if the driving capabilities of the power transistors PT are the same, and the driving current Idrv at a first level is required to turn on a first number of (e.g., n, where n is a natural number) power transistors PT, then when twice as many (e.g., 2n) power transistors PT are turned on, the driving current Idrv at a second level, which is double the driving current Idrv at the first level, is required.

The voltage comparing unit 120 may generate a comparative signal XCOM, which corresponds to a difference between the output voltage VOUT and a first reference voltage VRF1.

The output node OND may be connected to a load of functional blocks and may apply the output voltage VOUT to operate the functional blocks, where the load is an electrical component or circuit being powered. For example, when the LDO regulator 100 according to an embodiment of the present disclosure is included in an application processor, the functional blocks connected to the output node OND may be a central processing unit, a display controller, and a memory controller. In some cases, the output voltage VOUT from the output node OND may have a constant voltage level (e.g., a voltage level corresponding to the first reference voltage VRF1) when an amount of current drawn by the functional blocks varies. Accordingly, the functional blocks connected to the output node OND may be stably operated.

The voltage comparing unit 120 may include, for example, an operational (OP) amplifier or a set-reset (SR) latch. In this case, the output voltage VOUT and the first reference voltage VRF1 are respectively applied to two input terminals of the voltage comparing unit 120, and the comparative signal XCOM is output from an output terminal of the voltage comparing unit 120. For example, when the output voltage VOUT is the same as or greater than the first reference voltage VRF1, the comparative signal XCOM is output as logic high ("H"). When the output voltage VOUT is lower than the first reference voltage VRF1, the comparative signal XCOM is output as logic low ("L").

A digital control unit 130 receives the comparative signal XCOM from the voltage comparing unit 120. The digital control unit 130 may generate a control signal XCON in response to the comparative signal XCOM. The control signal XCON may be used to control the gating of the power transistors PT. For example, the control signal XCON may be used to control the switching on and off of some power transistors.

In some cases, according to the level of the driving current Idrv required with respect to the output voltage VOUT, the number powered-on of the power transistors PT may vary. The control signal XCON may be generated based on the number of powered-on power transistors, which corresponds to the comparative signal XCOM.

According to some embodiments, in order to control the switching on and off of transistors among the plurality of transistors PT, the control signal XCON may be generated to have a number of a plurality of bits that correspond to a number of the power transistors PT.

For example, when the number of the power transistors PT is 64, the control signal XCON may be generated with 64 bits indicated by the symbol [63:0]. Each bit in the control signal XCON may correspond to a different power transistor in the power transistors PT. To turn a transistor off, the corresponding bit in the control signal may be set to "0" (logic low); to turn the transistor on, the corresponding bit may be set to "1" (logic high). Accordingly, the control signal can be used to control the switching on and off of individual transistors in the group.

In response to the control signal XCON, for controlling gating of each power transistor PT, the gate driving unit 140 may output a gating signal XGT. The gating signal XGT can be one of the input voltage VIN and a negative of the input voltage −VIN of the corresponding power transistor PT. For example, when a bit in the control signal XCON is set to "1" (logic high), the gate driving unit 140 may output the input voltage VIN as the gating signal XGT for the corresponding power transistor and when a bit in the control signal XCON is set to "0" (logic low), the gate driving unit 140 may output the negative of the input voltage −VIN as the gating signal XGT.

Accordingly, a method for operating an LDO regulator includes generating an output voltage using one or more power transistors of an LDO regulator, wherein the output voltage is based on an input voltage of the one or more power transistors; determining a difference between the output voltage and a reference voltage; and generating a gating signal for the one or more power transistors based on the difference between the output voltage and a reference voltage, wherein the gating signal comprises the input voltage or a negative of the input voltage.

In some aspects, the method includes generating a comparative signal based on the difference between the output voltage and a first reference voltage and generating a control signal based on the comparative signal, wherein the gating signal is generated based on the control signal. In some aspects, the control signal comprises a plurality of bits for controlling a plurality of the one or more power transistors, respectively, and generating a plurality of gating signals corresponding to each of the plurality of bits, wherein each of the plurality of gating signals comprises the input voltage or a negative of the input voltage.

Figure 2:
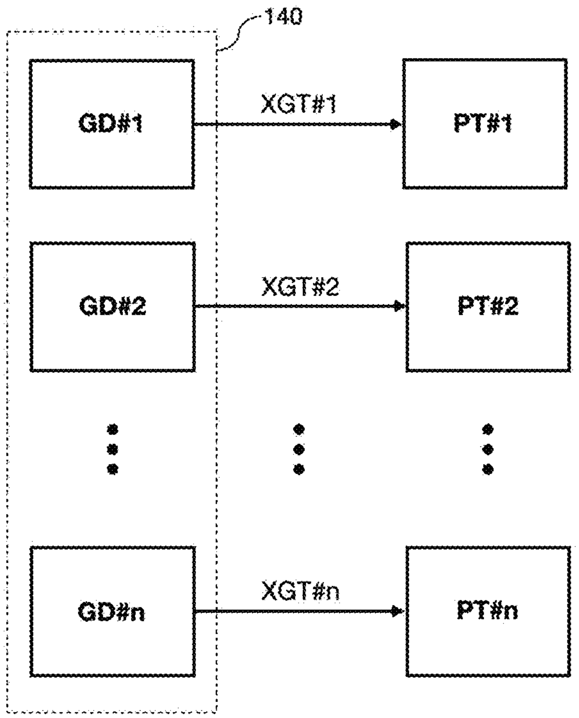
FIGS. 2 and 3 respectively illustrate the relationship between a gate driving unit and a power transistor according to an embodiment of the present disclosure.
Figure 3:
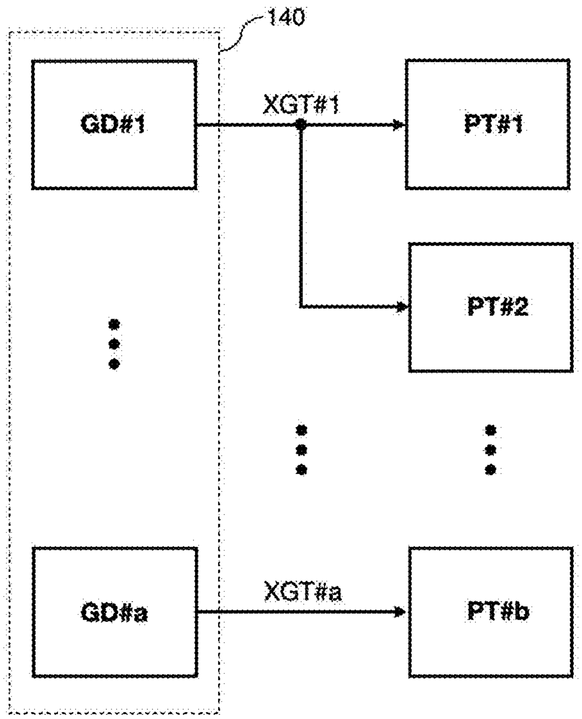

FIGS. 2 and 3 respectively illustrate a relationship between the gate driving unit 140 and the power transistors PT according to an embodiment of the present disclosure.

Referring to FIGS. 2 and 3, the gate driving unit 140 according to an embodiment of the present disclosure may include a number of the plurality of gate drivers GD corresponding to the number of the power transistors PT. For example, the gate driving unit 140 according to an embodiment of the present disclosure may include n gate drivers GD #1~GD #n, where n is the same as the number of power transistors PT (as shown in FIG. 2). In a different example, the gate driving unit 140 according to an embodiment of the present disclosure may include a gate drivers GD #1~GD #a, where a is less than the number b of power transistors PT (as shown in FIG. 3).

In the example where the gate driving unit 140 includes a gate drivers and there are b power transistors (a less than b), one gate driver GD may generate the gating signals XGT with respect to two or more power transistors PT. Here, each of the gate drivers GD #1~GD #a in the gate driving unit 140 according to an embodiment of the present disclosure may perform a gating operation with respect to the power transistors PT, which are in the same numbers, or the power transistors PT, which are in different numbers. FIG. 3 illustrates that a first gate driver GD #1 is shared by a first power transistor PT #1 and a second power transistor PT #2, where the a-th gate driver GD #a performs a gating operation on the b-th power transistor PT #b.

Hereinafter, description of the structure and operation of the gate driving unit 140 may be the same as the structure and operations of each gate driver GD included in the gate driving unit 140.

Referring back to FIG. 1, in some cases, according to some embodiments, the power transistor PT is a p-channel metal oxide semiconductor (PMOS) transistor, and the gate driving unit 140 generates the input voltage VIN as the gating signal XGT with respect to the power transistor to be turned off, in response to the corresponding control signal XCON; and the gate driving unit 140 generates the negative of the input voltage −VIN as the gating signal XGT with respect to the power transistor to be turned on, in response to the corresponding control signal XCON.

According to some embodiments, scaling down a complementary metal-oxide semiconductor (CMOS) process and reducing the power consumption of a large number of circuits requires low-voltage driving. In particular, because an increasing number of semiconductor devices or electronic devices are becoming mobile, there is a need for low-voltage operations of the devices. To meet the need for low-voltage operations in mobile devices, the level of the input voltage VIN used in these devices has gradually decreased. As a result, it may be desirable for the devices to operate at input voltages that are lower than the threshold voltage of the power transistors PT.

For example, the threshold voltage of the power transistor PT may be 0.5 V and the input voltage VIN may be 0.3 V. In this case, when the gating signal XGT is applied at the voltage of 0 V to turn on the power transistor PT, the absolute value of a source-gate voltage of the power transistor PT may be lower than 0.5 V, therefore lower than the threshold voltage of the power transistor PT. Accordingly, the power transistor PT may not be turned on, or the power transistor PT is turned on but the required driving current Idrv may not be generated. The same issue may occur when the input voltage VIN is slightly higher than the threshold voltage of the power transistor PT.

In the LDO regulator 100 according to an embodiment of the present disclosure, the negative of the input voltage −VIN generated from the gate driving unit 140 is used in gating of the power transistors PT so that the power transistors PT may be turned on or a current driving capability of the power transistors PT may be increased in an environment where the LDO regulator 100 needs to be operated at the low input voltage VIN. Accordingly, the LDO regulator 100 according to an embodiment of the present disclosure may be stably operated at low input voltage VIN. Hereinafter, the description thereof will be provided in more detail.

FIGS. 4 through 7 respectively illustrate the gate driving unit 140 according to an embodiment of the present disclosure.

Figure 4:
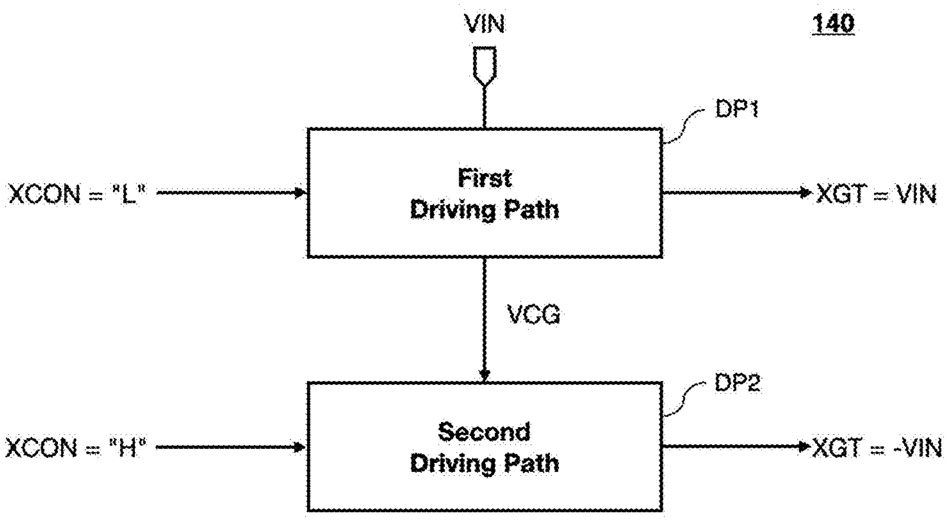
FIGS. 4 through 7 respectively illustrate a gate driving unit according to an embodiment of the present disclosure.

First, referring to FIG. 4, the gate driving unit 140 according to an embodiment of the present disclosure may include a first driving path DP1 and a second driving path DP2.

When the control signal XCON indicates a first mode, for example, when the control signal XCON indicates logic low ("L"), the first driving path DP1 may output the input voltage VIN as the gating signal XGT. In addition, the input voltage VIN may charge a charging voltage VCG in the DP1.

When the control signal XCON indicates a second mode, for example, when the control signal XCON indicates logic high ("H"), the second driving path DP2 may invert the charging voltage VCG charged in the driving path DP1 into the negative of the input voltage −VIN and output the negative of the input-VIN as the gating signal XGT.

Figure 5:
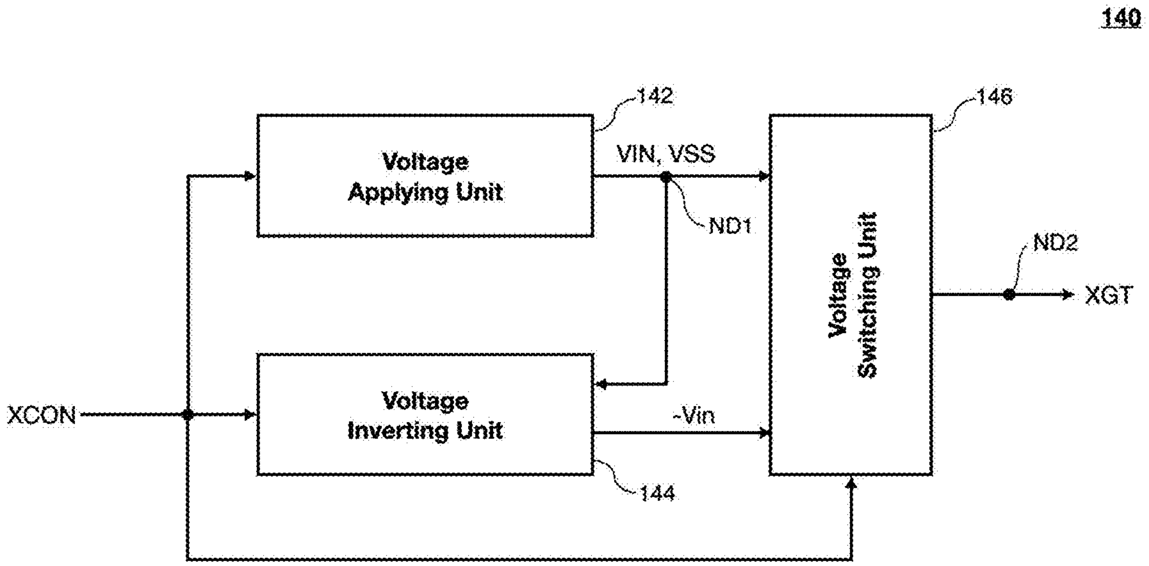

Next, referring to FIG. 5, the gate driving unit 140 according to an embodiment of the present disclosure may include a voltage applying unit 142, a voltage inverting unit 144, and a voltage switching unit 146.

The voltage applying unit 142 may apply one of the input voltage VIN and a ground voltage VSS to a first node ND1, in response to the control signal XCON. The voltage inverting unit 144 inverts the input voltage VIN applied from the first node ND1 and outputs the negative of the input voltage −VIN as the negative of the input voltage −VIN. The voltage switching unit 146 may output one of the input voltage VIN at the first node ND1 and the negative of the input voltage −VIN from the voltage inverting unit 144 to a second node ND2, in response to the control signal XCON.

Figure 6:
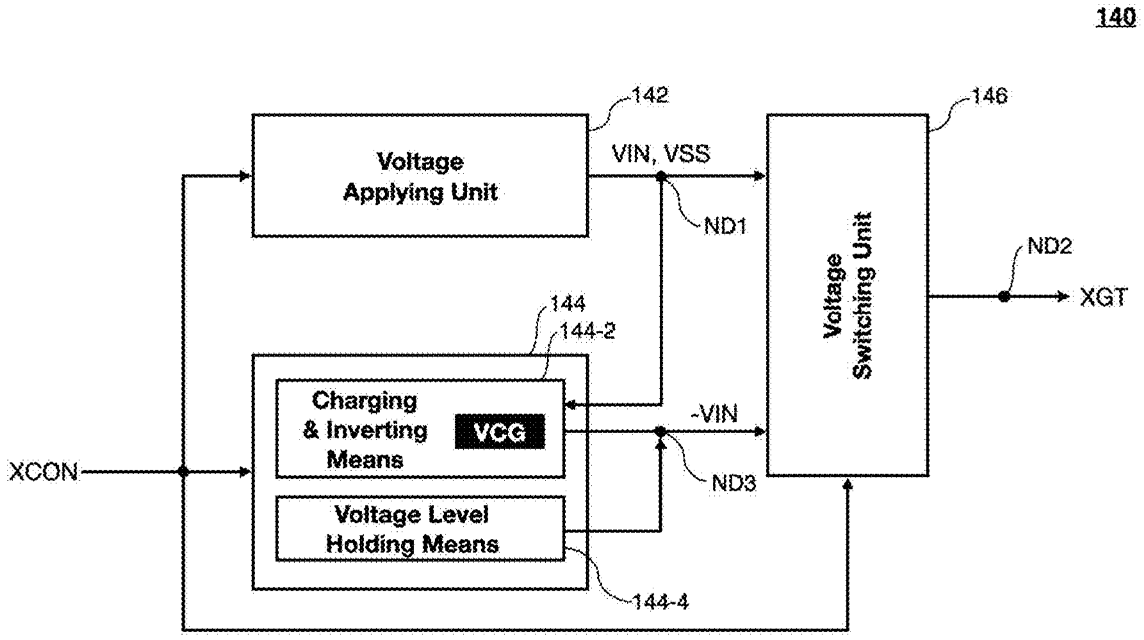

Next, referring to FIG. 6, the voltage inverting unit 144 may include a charging and inverting means 144-2, and a voltage level holding means 144-4. In some cases, when the input voltage VIN is applied from the first node ND1, the charging and inverting means 144-2 may charge the charging voltage VCG with the input voltage VIN. When the ground voltage VSS is applied from the first node ND1, the charging and inverting means 144-2 may invert the charging voltage VCG and generate the negative of the input voltage −VIN. The negative of the input voltage −VIN may be output to a third node ND3.

Here, a voltage level of the negative of the input voltage −VIN applied to the voltage switching unit 146 may vary due to a leakage current of wires or electric devices electrically connected to the third node N3. For example, when the negative of the input voltage −VIN which is lower than the absolute value of a required voltage level is applied to the voltage switching unit 146, the voltage level of the input voltage VIN is low as described above so that a power transistor PT of FIG. 1 is not turned on or a required driving current Idrv is not generated.

Accordingly, the voltage inverting unit 144 according to an embodiment of the present disclosure may hold the voltage level of the negative of the input voltage −VIN at the third node ND3 by using the voltage level holding means 144-4. For example, when the voltage level of the third node ND3 varies above a value, in order to maintain a voltage level, the voltage level holding means 144-4 may apply a level of current that corresponds to the value to the third node ND3.

The voltage applying unit 142, the voltage inverting unit 144, and the voltage switching unit 146 described above may be disposed as illustrated in FIG. 7.

Figure 7:
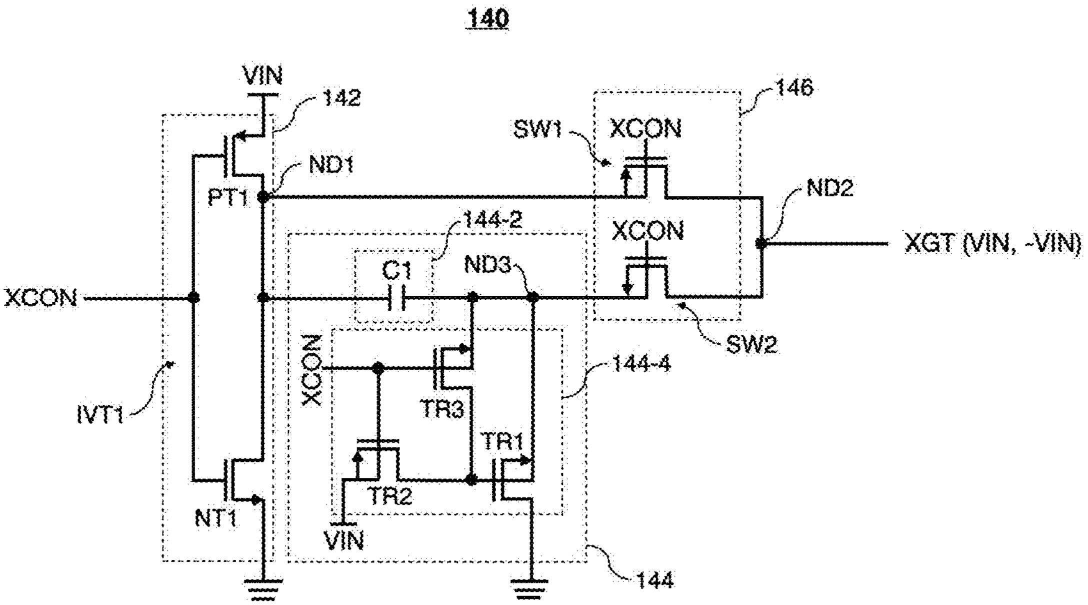

Referring to FIG. 7, the gate driving unit 140 according to an embodiment of the present disclosure may include a first inverter IVT1, a first switch SW1, a first capacitor C1, a second switch SW2, and a first transistor TR1 through a third transistor TR3.

The first inverter IVT1 includes a first PMOS transistor PT1 and a first NMOS transistor NT1 connected between the input voltage VIN and the ground voltage VSS. The control signal XCON is applied to an input terminal of the first inverter IVT1 and one of the input voltage VIN and the ground voltage VSS may be output to an output terminal of the first node ND1.

The first switch SW1 is electrically connected between the first node ND1 and the second node ND2 and may be switched in response to the control signal XCON. The first capacitor C1 is electrically connected between the first node ND1 and the third node ND3. The second switch SW2 is electrically connected between the third node ND3 and the second node ND2 and may be gated in response to the control signal XCON. The first transistor TR1 is electrically connected between the third node ND3 and the ground voltage VSS. A second transistor TR2 is electrically connected between the input voltage VIN and the first transistor TR1 and may be gated in response to the control signal XCON. The third transistor TR3 is electrically connected between the third node ND3 and the first transistor TR1 and may be gated in response to the control signal XCON.

The first inverter IVT1 may refer to the voltage applying unit 142 of FIG. 5, the first capacitor C1 and the first through third transistors TR1 through TR3 may refer to the voltage inverting unit 144 of FIG. 5, and the first and second switches SW1 and SW2 may refer to the voltage switching unit 146 of FIG. 5. For example, the first capacitor C1 may be the charging and inverting means 144-2 of FIG. 6 and the first through third transistors TR1 through TR3 may be the voltage level holding means 144-4 of FIG. 6.

FIG. 7 illustrates an example where the first and third transistors TR1 and TR3 are n-channel metal oxide semiconductor (NMOS) transistors and the second transistor TR2 is a PMOS transistor. The first through third transistors TR1 through TR3 may be other types of transistors so that the operation and efficiency of the gate driving unit 140 below according to an embodiment of the present disclosure can be realized. The first switch SW1 may be a PMOS transistor and the second switch SW2 may be an NMOS transistor in the same or a similar manner. Here, the first switch SW1, the second switch SW2, and the first transistor TR1 through the third transistor TR3 included in the gate driving unit 140 according to an embodiment of the present disclosure may refer to the transistors illustrated as in FIG. 7.

Figure 8:
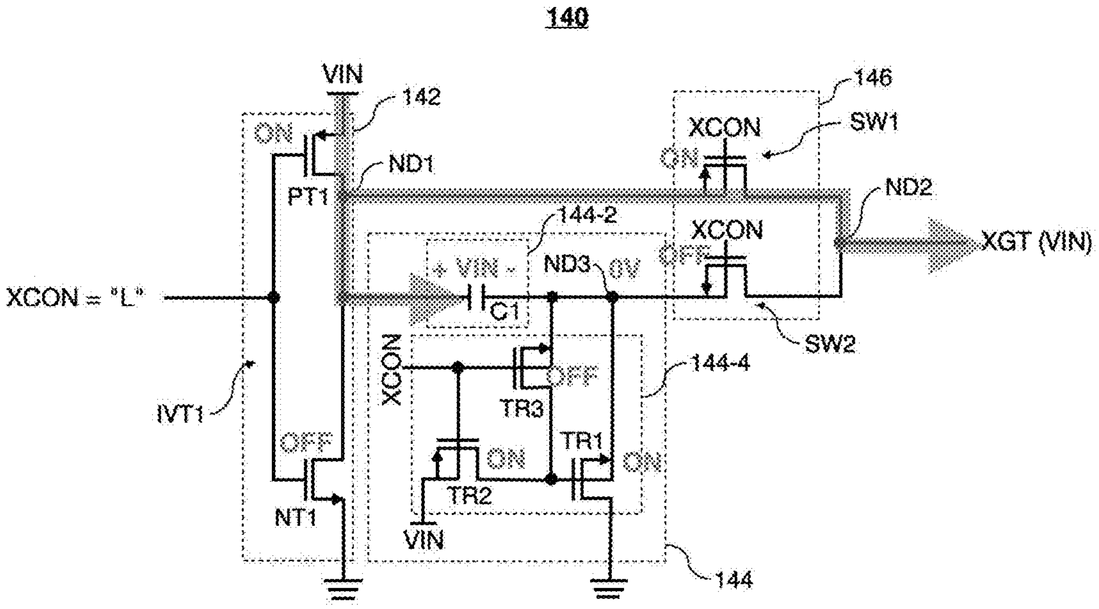
FIGS. 8 and 9 respectively illustrate operations of the gate driving unit of FIG. 7.
Figure 9:
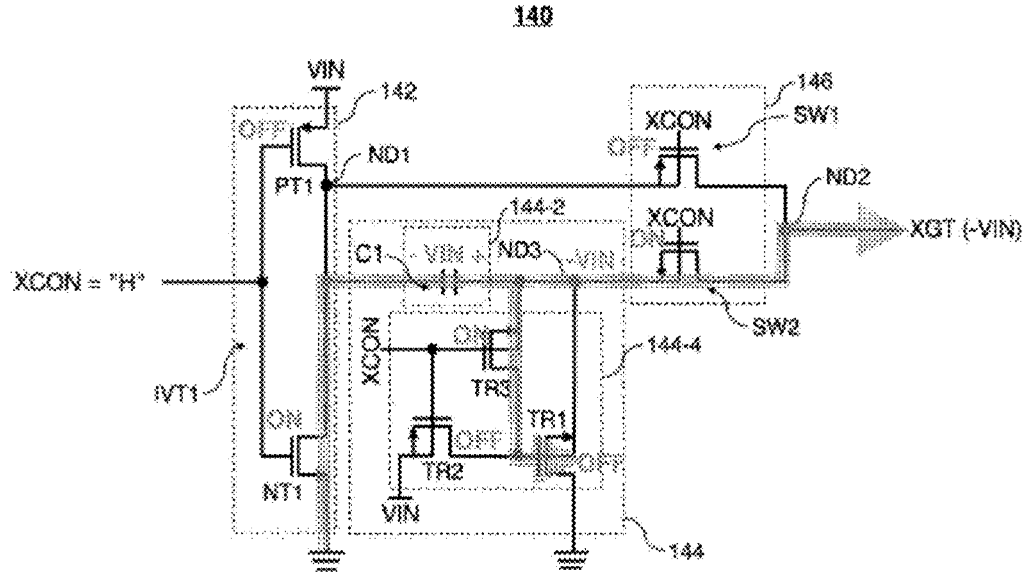

FIGS. 8 and 9 illustrate operations of the gate driving unit 140 of FIG. 7.

Referring to FIGS. 7 and 8, when the control signal XCON is applied as logic low ("L"), the first PMOS transistor PT1 of the first inverter IVT1 is turned on and the input voltage VIN is applied to the first node ND1. Similarly, the first switch SW1, and the second transistor TR2, which are the PMOS transistors, are also turned on. Accordingly, the input voltage VIN of the first node ND1 may be applied to the second node ND2 through the first switch SW1. A voltage of the second node ND2, that is the input voltage VIN may be output as the gating signal XGT.

Here, as the second transistor TR2 is turned on, the input voltage VIN is applied to the gate of the first transistor TR1. When the first transistor TR1 is the NMOS transistor and is turned on, the ground voltage of 0V is applied to the third node ND3.

In some cases, the control signal XCON is applied as logic low ("L"), and the first capacitor C1 may be charged with the input voltage VIN, where the first capacitor C1 is electrically connected between the first node ND1 and the third node ND3, where the input voltage VIN is applied to the first node ND1 and 0V is applied to the third node ND3.

Next, referring to FIGS. 7 and 9, in the gate driving unit 140 according to an embodiment of the present disclosure, when the control signal XCON is applied as logic high ("H"), the first NMOS transistor NT1 of the first inverter IVT1 is turned on and the voltage of the first node ND1 is changed to the ground voltage of 0V. Accordingly, the input voltage VIN charged to the first capacitor C1 may be inverted to obtain the negative of the input voltage −VIN. Thus, the negative of the input voltage −VIN may be applied to the third node ND3.

Similarly, the second switch SW2, and the third transistor TR3, which are the NMOS transistors, are also turned on. Accordingly, the negative of the input voltage −VIN applied to the third node ND3 may be applied to the second node ND2 through the second switch SW2. The voltage of the second node ND2, that is, the negative of the input voltage −VIN may be output as the gating signal XGT.

Here, as the second transistor TR2 is turned off and the third transistor TR3 is turned on, the voltage of the third node ND3 (in this example the negative of the input voltage −VIN), may be applied to the gate of the first transistor TR1. Therefore, the state that the first transistor TR1 is turned off may be maintained so that the voltage level of the negative of the input voltage −VIN at the third node ND3 may be prevented from being varied due to, for example, a leakage current.

While the control signal XCON is applied as a logic high ("H") according to the operations of the gate driving unit 140 described above, the negative of the input voltage −VIN may be applied to the gate of the power transistor PT of FIG. 1, where the voltage level of the input voltage −VIN corresponds to a level of driving current Idry to the output OND. For example, the absolute value of a source-gate voltage of the power transistor PT may be double the input voltage VIN so that sufficient driving current Idrv may be supplied to the output node OND with respect to the input voltage VIN (which may have a relatively low voltage level compared to a conventional design).

Figure 10:
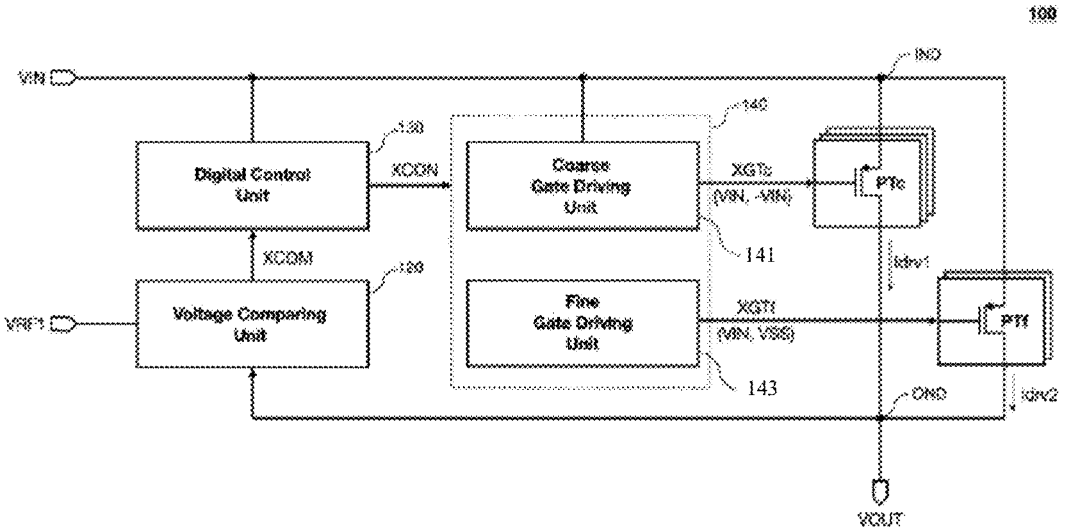
FIGS. 10 and 11 respectively illustrate an LDO regulator according to an embodiment of the present disclosure.
Figure 11:
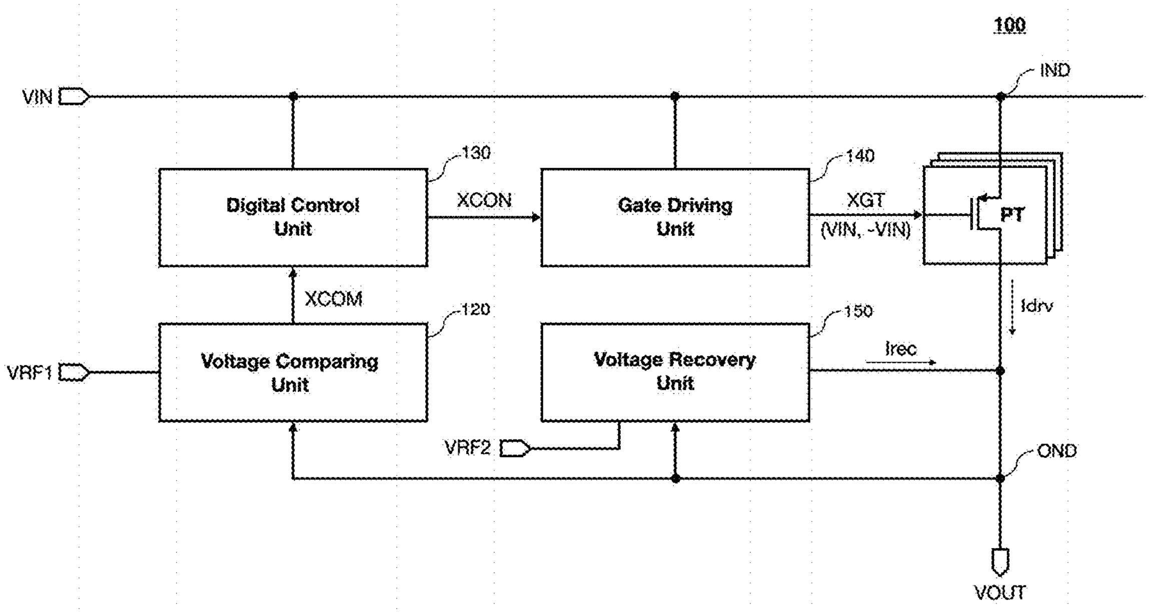

FIGS. 10 and 11 respectively illustrate the LDO regulator 100 according to an embodiment of the present disclosure.

First, referring to FIG. 10, the power transistors PT of the LDO regulator 100 according to an embodiment of the present disclosure may include a coarse power transistor PTc and a fine power transistor PTf. The terms "coarse" and "fine" refer control loops (with corresponding power transistors) with different voltage ranges, where the term "coarse" refers to a first control loop with a first voltage range and the term "fine" refers to a second control loop with a second voltage range that is narrower than the first control loop. According to some embodiments, the coarse power transistor PTc may be included in a coarse loop used to regulate the output voltage VOUT within a first voltage range. The fine power transistor PTf may be included in a fine loop used to regulate the output voltage VOUT within a second voltage range, which is narrower than the first voltage range.

For example, when voltage fluctuation of the output node OND is above a reference range, the digital control unit 130 of the LDO regulator 100 according to an embodiment of the present disclosure may generate the control signal XCON to activate the coarse loop. In this case, a first driving current Idrv1 may be applied to the output node OND by the coarse power transistor PTc. Also, when voltage fluctuation of the output node OND is below a reference range, the digital control unit 130 may generate the control signal XCON to activate the fine loop. In this case, a second driving current Idrv2 may be applied to the output node OND by the fine power transistor PTf.

In the examples described above, the control signal XCON may include one or more bits indicating one loop of the coarse loop and the fine loop to be activated, in addition to 64 bits.

In some cases, the driving capability of each coarse power transistor PTc may be greater than that of each fine power transistor PTf. In some cases, the number of the coarse power transistors PTc may be greater than that of the fine power transistors PTf. In some cases, the driving capability of each coarse power transistor PTc may be greater than that of each fine power transistor PTf and the number of the coarse power transistors PTc may be greater than that of the fine power transistors PTf.

According to some embodiments, the coarse loop and the fine loop in the LDO regulator 100 may operate during the same reference time. For example, the LDO regulator 100 may operate while being synchronized with a clock signal CKL. Accordingly, in the same reference time, the first driving current Idrv1 may be greater than the second driving current Idrv2. That is, when the coarse loop is activated, the output voltage VOUT may be regulated within the first voltage range, and when the fine loop is activated, the output voltage VOUT may be regulated within the second voltage range, and the second range is narrower than the first range. That is, the difference between a lowest voltage and a highest voltage of the second range may be less than a difference between a lowest voltage and a highest voltage of the first range.

The gate driving unit 140 according to an embodiment of the present disclosure may include a coarse gate driving unit 141 and a fine gate driving unit 143. The coarse gate driving unit 141 may output a coarse gating signal XGTc, which is a gating signal of the coarse power transistor PTc. The fine gate driving unit 143 may output a fine gating signal XGTf, which is a gating signal of the fine power transistor PTf.

In some cases, the coarse gate driving unit 141 may output one of the input voltage VIN and the negative of the input voltage −VIN as the coarse gating signal XGTc. In some cases, the fine gate driving unit 143 including the fine power transistor PTf having relatively low driving capability, compared with the coarse gate driving unit 141, may output one of the input voltage VIN and the ground voltage VSS as the fine gating signal XGTf.

The fine gate driving unit 143 may also output one of the input voltage VIN and the negative of the input voltage −VIN as the fine gating signal XGTf in situations including when the driving capability of the fine power transistor PTf may cause a problem due to its low input voltage, or when the area enlargement by additional circuit logic for applying the negative of the input voltage −VIN to the fine power transistor PTf allows with respect to the fine gate driving unit 143.

Next, referring to FIG. 11, the LDO regulator 100 according to an embodiment of the present disclosure may further include a voltage recovery unit 150.

When the output voltage VOUT falls outside a predetermined range, the voltage recovery unit 150 is activated and connected to the output node OND. For example, the voltage recovery unit 150 may be activated when the voltage level of the output voltage VOUT drops below a second reference voltage VRF2 despite having a target voltage of a first reference voltage VRF1). The voltage recovery unit 150 accordingly regulates the range of fluctuation of the output voltage (VOUT) to a second range that is narrower than the first range In some cases, the level of the driving current Idrv applied to the output node OND by the power transistors PT may vary to reduce fluctuation in the voltage level of the output voltage VOUT. Detecting the fluctuation in the voltage level of the output voltage VOUT (using the voltage comparing unit 120), performing control with respect to the detection result (using the comparative signal XCOM) (and using the digital control unit 130), and then, regulating the driving current Idrv through gating of the corresponding power transistors PT may be performed by being synchronized with a clock signal for the operation of the LDO regulator 100 according to an embodiment of the present disclosure.

Accordingly, each operation mentioned above is performed and then, one or more clock cycles may be needed to recover the required voltage level (for example, the first reference voltage VRF1) of the output voltage VOUT from the output voltage VOUT of the output node OND, where a voltage is dropped. In some cases, the sharp voltage drop of the output voltage VOUT may cause misoperation at loads connected to the output node OND. In this regard, rapid recovery of the output voltage VOUT may be required.

The frequency of the clock signal used to regulate synchronization of the operation of the LDO regulator 100 according to an embodiment of the present disclosure may be raised to reduce the time needed to recover the output voltage VOUT. When the frequency of the clock signal is raised, the power required may be also increased.

The LDO regulator 100 according to an embodiment of the present disclosure may further include the voltage recovery unit 150, which, without necessarily raising the frequency of the clock signal, improves the recovery speed of the output voltage VOUT. The voltage recovery unit 150 according to an embodiment of the present disclosure may supply a recovery current Irec to the output node OND more rapidly using a structure that does not necessarily involve supplying the driving current Idrv to the output node OND through the power transistor PT.

In addition, the voltage recovery unit 150 according to an embodiment of the present disclosure may perform a recovery operation of the output voltage VOUT using the low input voltage VIN and thereby, transient response performance may be increased at the output node OND. Hereinafter, the structure and operation of the voltage recovery unit 150 will be further described.

Figure 12:
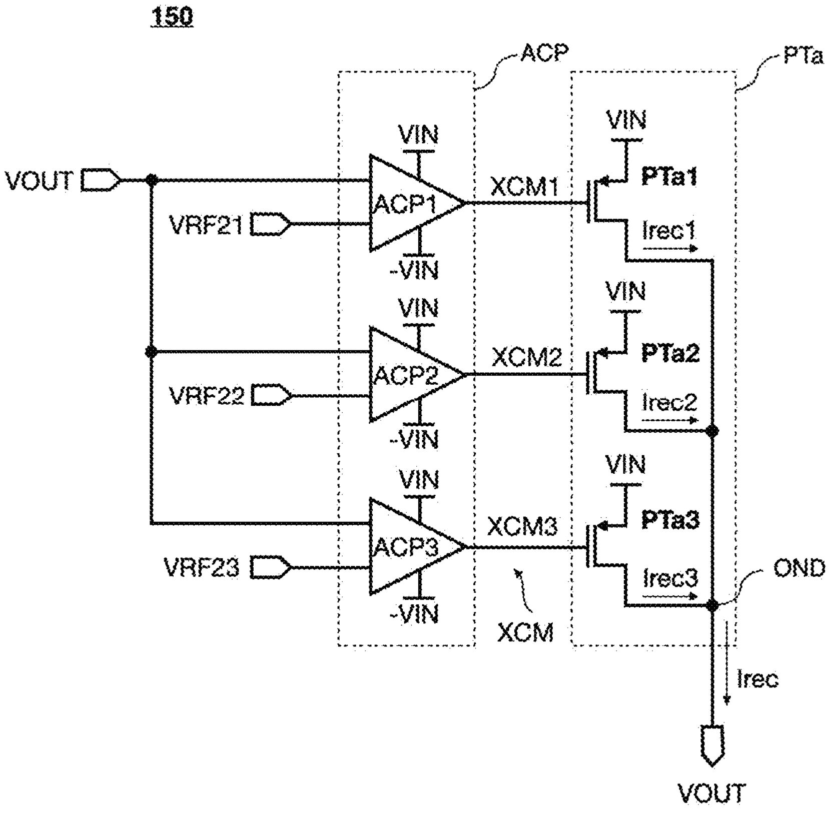
FIG. 12 illustrates a voltage recovery unit according to an embodiment of the present disclosure.

FIG. 12 illustrates the voltage recovery unit 150 according to an embodiment of the present disclosure.

Referring to FIGS. 11 and 12, the voltage recovery unit 150 according to an embodiment of the present disclosure may include at least one auxiliary comparator ACP and at least one auxiliary power transistor PTa.

Each of the auxiliary comparators ACP may compare the corresponding second reference voltage with the output voltage VOUT of at least one second reference voltages VRF2 and output one of the input voltage VIN and the negative of the input voltage −VIN as an auxiliary comparative signal XCM. For example, when the output voltage VOUT is lower than the corresponding second reference voltage, the negative of the input voltage −VIN may be output as the auxiliary comparative signal XCM.

Each of the at least one auxiliary power transistor Pta may supply the recovery current Irec to the output node OND, in response to the auxiliary comparative signal XCM of the corresponding auxiliary comparator ACP from the at least one auxiliary comparator ACP.

FIG. 12 illustrates the voltage recovery unit 150 according to an embodiment of the present disclosure that includes three auxiliary comparators ACP and three auxiliary power transistors Pta.

For example, a first auxiliary comparator ACP1 may compare the level of the output voltage VOUT to a level of a (2-1)-th reference voltage VRF21 and output a first auxiliary comparative signal XCM1. A second auxiliary comparator ACP2 may compare the level of the output voltage VOUT to a level of a (2-2)-th reference voltage VRF22 and output a second auxiliary comparative signal XCM2. A third auxiliary comparator ACP3 may compare the level of the output voltage VOUT to a level of a (2-3)-th reference voltage VRF23 and output a third auxiliary comparative signal XCM3.

A first auxiliary power transistor Pta1 may supply a first recovery current Irec1 to the output node OND, in response to the first auxiliary comparative signal XCM1, a second auxiliary power transistor Pta2 may supply a second recovery current Irec2 to the output node OND, in response to the second auxiliary comparative signal XCM2, and a third auxiliary power transistor Pta3 may supply a third recovery current Irec3 to the output node OND, in response to the third auxiliary comparative signal XCM3.

The voltage recovery unit 150 according to an embodiment of the present disclosure may include various numbers of auxiliary comparators ACP and auxiliary power transistors Pta to correspond to the required transient response performance.

According to some embodiments, reference voltages are used to refer to the range of fluctuation for the output voltage VOUT. For example, the (2-1)-th reference voltage VRF21 through the (2-3)-th reference voltage VRF23 may be different from each other. For example, a voltage difference between the first reference voltage VRF1 and the (2-1)-th reference voltage VRF21 may be the smallest and a voltage difference between the first reference voltage VRF1 and the (2-3)-th reference voltage VRF23 may be the greatest. Also, the size and driving capability of the first auxiliary power transistor Pta1 through the third auxiliary power transistor Pta3 may be different from each other. For example, the size of the first auxiliary power transistor Pta1 may be the smallest and the size of the third auxiliary power transistor Pta3 may be the greatest.

In this case, when the output voltage VOUT is dropped below the (2-1)-th reference voltage VRF21, the (2-2)-th reference voltage VRF22, and the (2-3)-th reference voltage VRF23 in sequence, the first auxiliary power transistor Pta1, the second auxiliary power transistor Pta2, and the third auxiliary power transistor Pta3 may be turned on in order, correspondingly. Then, when the voltage level of the output voltage VOUT is recovered sequentially and exceeds the (2-3)-th reference voltage VRF23, the (2-2)-th reference voltage VRF22, and the (2-1)-th reference voltage VRF21 in sequence, the third auxiliary power transistor Pta3, the second auxiliary power transistor Pta2, and the first auxiliary power transistorPTa1 may be turned off in order, correspondingly.

According to some embodiments, when the output voltage VOUT drops sharply below the (2-3)-th reference voltage VRF23 due to the relatively large driving capability of the third auxiliary power transistor Pta3, a relatively large third recovery current Irec3 is supplied to the output node OND so the output voltage VOUT can be recovered rapidly. During the recovery stage of the voltage level of the output voltage VOUT, the third recovery current Irec3 is prevented from being applied to the output node OND, and the output voltage VOUT is instead recovered using a recovery current with a smaller magnitude, such as the first recovery current Irec1 or the second recovery current Irec2.

Therefore, the voltage recovery unit 150 according to an embodiment of the present disclosure may additionally supply the recovery current Irec to the output node OND more rapidly compared to the supply of the driving current Idrv and thus, a problem occurring due to the sharp voltage drop of the output voltage VOUT may be solved. In addition, the voltage recovery unit 150 according to an embodiment of the present disclosure may perform the optimal recovery operation according to a degree of the voltage drop of the output voltage VOUT and may prevent the output voltage VOUT from being excessively increased.

Figure 13:
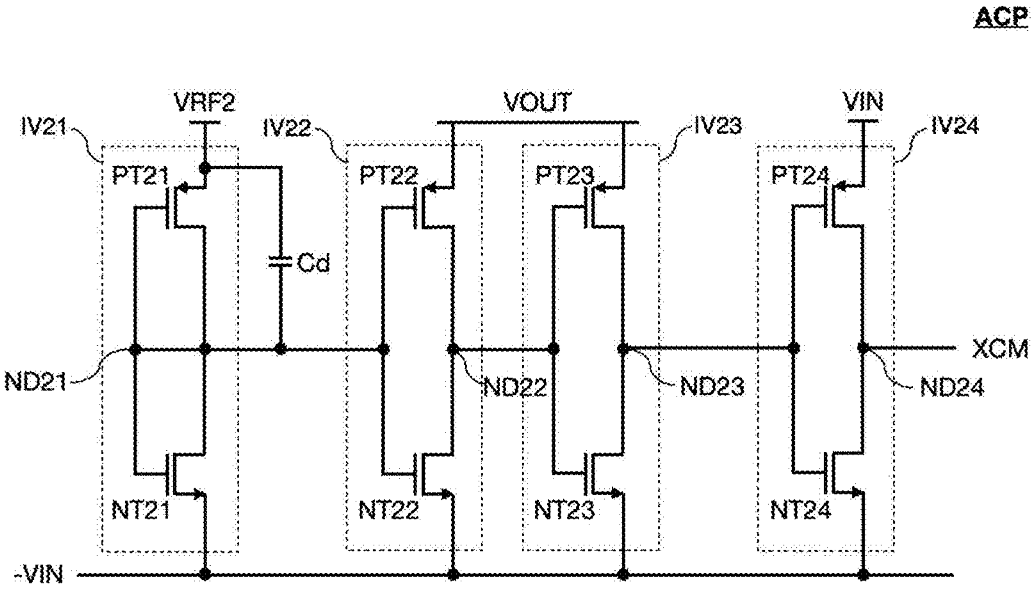
FIG. 13 illustrates an auxiliary comparator according to an embodiment of the present disclosure.

FIG. 13 illustrates the auxiliary comparator ACP according to an embodiment of the present disclosure.

Referring to FIG. 13, the auxiliary comparator ACP according to an embodiment of the present disclosure is an analog comparator and may rapidly perform a comparing operation at the low input voltage VIN without power loss occurring due to an increase in frequency. In this regard, the auxiliary comparator ACP according to an embodiment of the present disclosure may include a first auxiliary inverter IV21 through a fourth auxiliary inverter IV24.

The first auxiliary inverter IV21 may include a (2-1)-th PMOS transistor PT21 and a (2-1)-th NMOS transistor NT21, where the (2-1)-th PMOS transistor PT21 and the (2-1)-th NMOS transistor NT21 are disposed between the second reference voltage VRF2 and the negative of the input voltage −VIN, and an input terminal and an output terminal thereof may be connected at a (2-1)-th node ND21. Accordingly, a voltage corresponding to the second reference voltage VRF2 may be applied to the (2-1)-th node ND21. In order to constantly maintain a voltage level at the (2-1)-th node ND21, a decoupling capacitor Cd may be further included and connected between the second reference voltage VRF2 and the (2-1)-th node ND21.

A second auxiliary inverter IV22 may include a (2-2)-th PMOS transistor PT22 and a (2-2)-th NMOS transistor NT22, (2-2)-th PMOS transistor PT22 and the (2-2)-th NMOS transistor NT22 disposed between the output voltage VOUT and the negative of the input voltage −VIN, and an input terminal thereof may be connected to the output terminal of the first auxiliary inverter IV21, that is, the (2-1)-th node ND21. A third auxiliary inverter IV23 may include a (2-3)-th PMOS transistor PT23 and a (2-3)-th NMOS transistor NT23, the (2-3)-th PMOS transistor PT23 and the (2-3)-th NMOS transistor NT23 disposed between the output voltage VOUT and the negative of the input voltage −VIN, and an input terminal thereof may be connected to an output terminal of the second auxiliary inverter IV22 at a (2-2)-th node ND22. The fourth auxiliary inverter IV24 may include a (2-4)-th PMOS transistor PT24 and a (2-4)-th NMOS transistor NT24, (2-4)-th PMOS transistor PT24 and the (2-4)-th NMOS transistor NT24 disposed between the input voltage VIN and the negative of the input voltage −VIN, an input terminal thereof may be connected to an output terminal of the third auxiliary inverter IV23 at a (2-3)-th node ND23, and the auxiliary comparative signal XCM may be output to an output terminal thereof connected to a (2-4)-th node ND24.

Referring to FIGS. 12 and 13, when the output voltage VOUT drops below the second reference voltage VRF2, the auxiliary comparator ACP according to an embodiment of the present disclosure described above may generate the negative of the input voltage −VIN as the auxiliary comparative signal XCM. In this case, the negative of the input voltage −VIN is applied to the (2-2)-th node ND22 by the (2-2)-th NMOS transistor NT22, and the output voltage VOUT is applied to the (2-3)-th node ND23 by the (2-3)-th PMOS transistor PT23, and the negative of the input voltage −VIN may be applied to the (2-4)-th node ND24 by the (2-4)-th NMOS transistor NT24.

At the (2-4)-th node ND24, the negative of the input voltage −VIN may be transmitted to the auxiliary power transistor Pta as the auxiliary comparative signal XCM. In the auxiliary comparative signal XCM, the absolute value of the source-gate voltage doubles the input voltage VIN, that is, 2*VIN, and thereby, the driving capability of the auxiliary power transistor Pta may be increased. Accordingly, the auxiliary power transistor Pta may rapidly supply the recovery current Irec to the output node OND.

As described above, when the (2-1)-th reference voltage VRF21 through the (2-3)-th reference voltage VRF23 are different from each other, the second reference voltage VRF2 applied to the first auxiliary inverter IV21 of each auxiliary comparator ACP may be a reference voltage corresponding to one of the (2-1)-th reference voltage VRF21 through the (2-3)-th reference voltage VRF23. For example, the (2-1)-th reference voltage VRF21 may be applied to the first auxiliary inverter IV21 of the first auxiliary comparator ACP1, the (2-2)-th reference voltage VRF22 may be applied to the first auxiliary inverter IV21 of the second auxiliary comparator ACP2, and the (2-3)-th reference voltage VRF23 may be applied to the first auxiliary inverter IV21 of the third auxiliary comparator ACP3.

Figure 14:
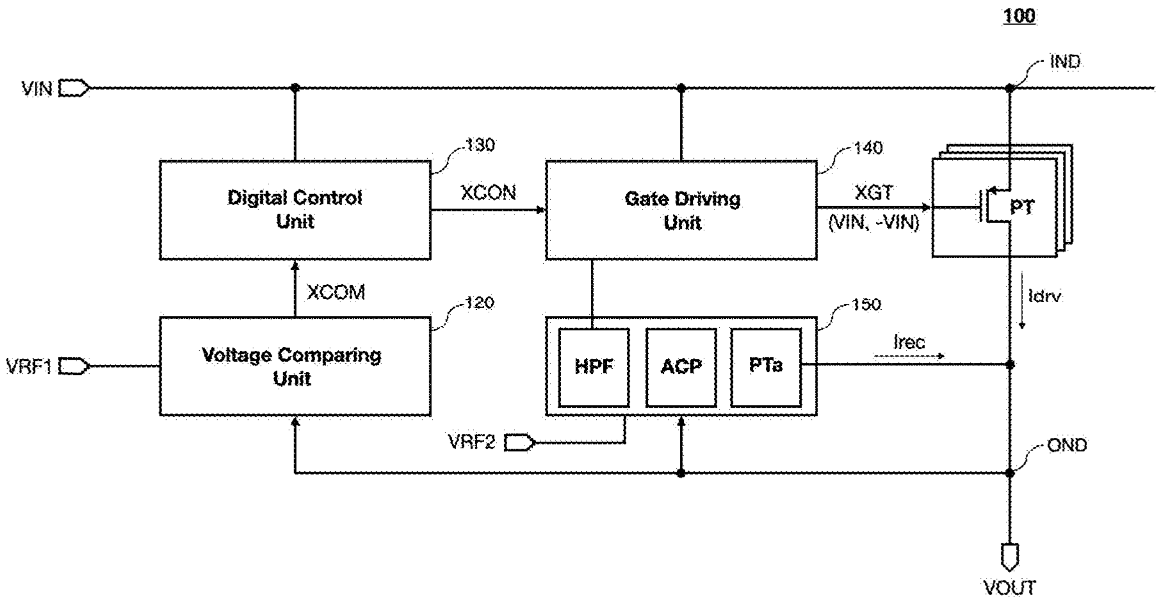
FIG. 14 illustrates a voltage recovery unit according to an embodiment of the present disclosure.

FIG. 14 illustrates the voltage recovery unit 150 according to an embodiment of the present disclosure.

Referring to FIG. 14, the voltage recovery unit 150 of FIG. 14 may include the auxiliary comparator ACP and the auxiliary power transistor Pta described in FIG. 12. In addition, the voltage recovery unit 150 of FIG. 14 may further include a high pass filter (HPF). For example, an HPF allows high-frequency signals to pass through while blocking or attenuating low-frequency signals.

An input terminal of the high pass filter HPF may be connected to the output node OND. An output terminal of the high pass filter HPF may be connected to a node of the gate driving unit 140 where the negative of the input voltage −VIN is applied, for example, the third node ND3 of FIG. 7.

The output terminal of the high pass filter HPF is connected to the third node ND3 of FIG. 7 of the gate driving unit 140 and may regulate the voltage level of the gating signal XGT, which is applied to the power transistor PT. Accordingly, the voltage level of the gating signal XGT may get lower to a degree for a period of time due to AC coupling by the high pass filter HPF. Here, the high pass filter HPF is a resistor-capacitor (RC) high pass filter HPF and may filter a high-frequency range according to the fluctuation of the output voltage VOUT.

In other words, the absolute value of the source-gate voltage of the power transistor PT may get bigger by a degree than the negative of the input voltage −VIN for a period of time from when the voltage drop of the output voltage VOUT occurs. Accordingly, a greater driving current Idrv may be supplied to the output node OND.

Here, since the high pass filter HPF does not require the operations of the voltage comparing unit 120 and the digital control unit 130 for driving the power transistor PT, the output voltage VOUT may be rapidly recovered.

According to the LDO regulator 100 according to an embodiment of the present disclosure, unlike FIG. 14, the voltage recovery unit 150 may not include the auxiliary comparator ACP and the auxiliary power transistor Pta and may only include the high pass filter HPF based on required transient response, power, or area.

Figure 15:
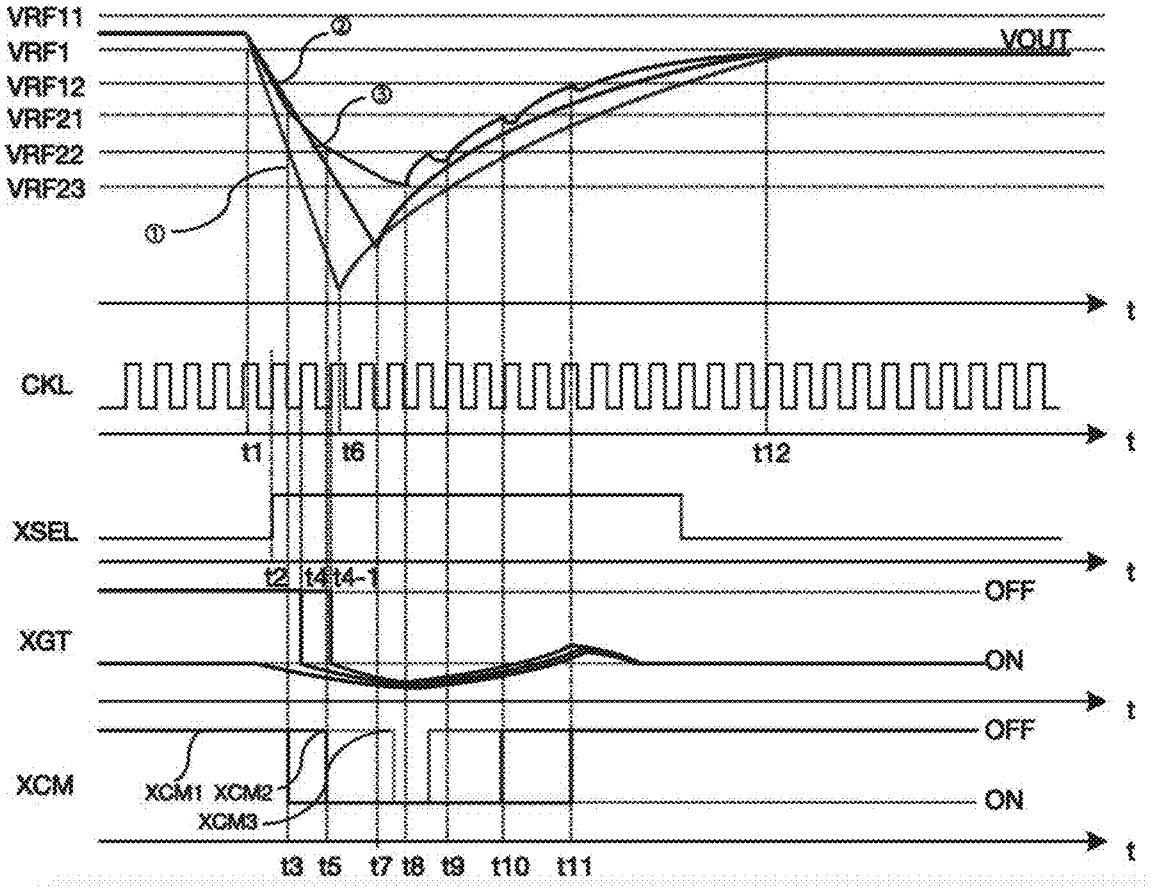
FIG. 15 illustrates a function of a voltage recovery unit according to an embodiment of the present disclosure.

FIG. 15 illustrates a function of the voltage recovery unit 150 according to an embodiment of the present disclosure.

Referring to FIGS. 12 through 15, when a voltage of a load connected to the output node OND sharply increases, an electric charge charged to a load capacitor is provided to the load in advance, the output voltage VOUT may be sharply dropped. When the voltage drop of the output voltage VOUT fluctuates above the first fluctuation range, for example, when the output voltage VOUT is dropped from the voltage level of the first reference voltage VRF1 to below the second reference voltage VRF2, the power transistor PT is only operated as shown in pattern ① in FIG. 15.

When the auxiliary comparator ACP, the auxiliary power transistor Pta, and the high pass filter HPF included in the voltage recovery unit 150 are operated with the power transistor PT (pattern ②), the voltage level may be rapidly recovered compared with the case where the power transistor PT is only operated (pattern ①). Furthermore, when the auxiliary comparator ACP and the auxiliary power transistor Pta are not operated, that is, when the high pass filter HPF is operated with the power transistor PT (pattern ③), the voltage level may be rapidly recovered compared with the case where the power transistor PT is only operated (pattern ①), and the voltage level may be slowly recovered compared with the case where the power transistor PT, the auxiliary comparator ACP, the auxiliary power transistor Pta, and the high pass filter HPF are all operated (pattern ②).

Each pattern will be described in more detail below. According to some embodiments, the LDO regulator 100 may operate while being synchronized with a clock signal CKL and the LDO regulator includes both coarse loop and fine loop as illustrated in FIG. 10. For example, the coarse loop and the fine loop may operate in the same reference time.

In an embodiment shown in pattern ①, a delay may occur from time t1, when the voltage drop of the output voltage VOUT starts to reach below the first reference voltage VRF1, to the point, when a selection signal XSEL is activated to change the fine loop to the coarse loop based on the comparative signal XCOM of the voltage comparing unit 120. FIG. 15 illustrates that the selection signal XSEL is activated at time t2 when the first clock of the clock signal CKL transitions to a logic high after the time t1. Here, the fine loop may be activated based on a difference between the output voltage VOUT and a (1-1)-th reference voltage VRF11. When the output voltage VOUT is below a (1-2)-th reference voltage VRF12, the coarse loop may be activated.

An additional delay may occur until the selection signal XSEL is activated and the corresponding power transistor PT is gated by the gating signal XGT. When the coarse loop is activated by the selection signal XSEL, the control signal XCON including identification information on the power transistor PT to be turned on may be applied to the gate driving unit 140 as described above.

FIG. 15 illustrates that a power transistor PT is turned on at time t4 where one clock is delayed from the time t2, while 24 power transistors PT are turned on before the time t1. After the time t4, as the output voltage VOUT is lower than the (1-2)-th reference voltage VRF12, 24 power transistors PT may be further turned on at time t4-1 which is the next consecutive clock of the clock signal CLK.

For reference, in FIG. 15, only the time when the gating signal XGT transitions to logic low ("L") is considered in pattern ① and the voltage level of the gating signal XGT reflects the pattern ② or AC coupling of the pattern ③. An effect on AC coupling of the gating signal XGT will be described later.

Since two power transistors PT are further turned on and the driving current Idrv supplied to the output node OND increases, the voltage level of the output voltage VOUT starts to increase at time t6 and may be recovered between the (1-1)-th reference voltage VRF11 and the (1-2)-th reference voltage VRF12 at time t12.

Next, in an embodiment shown in pattern ②, the recovery current Irec may be supplied to the output node OND by the auxiliary comparator ACP and the auxiliary power transistor Pta, before the twenty-fifth power transistor PT is turned on at the time t4. For example, the first auxiliary power transistor Pta1 is turned on by the first auxiliary comparative signal XCM1, which transitions to logic low ("L") at the time t3 when the output voltage VOUT starts to drop below the (2-1)-th reference voltage VRF21, and the first recovery current Irec1 may be supplied to the output node OND.

Here, the AC coupling described above is performed in the high pass filter HPF before and after the time t1 due to the voltage drop of the output voltage VOUT, and thus, the gating signal XGT may be set to be lower by a degree than the negative of the input voltage −VIN. For example, the voltage level of the gating signal XGT with respect to 24 power transistors PT, which are already turned on due to an effect of the AC coupling, may get lower before the time t4 when the twenty-fifth power transistor PT is turned on. Accordingly, the absolute value of the source-gate voltage of the power transistor PT increases, and thereby, the greater driving current Idrv may be supplied to the output node OND. Also, the twenty-fifth and twenty-sixth power transistors PT, which are turned on after the time t4, are in the same manner.

In the section from t1 to t6, it may be demonstrated that the voltage fluctuation range of the output voltage VOUT decreases by the first recovery current Irec1, compared with the embodiment shown in pattern ①.

The second auxiliary power transistor Pta2 is turned on by the second auxiliary comparative signal XCM2, which transitions to logic low ("L") at the time t5 when the output voltage VOUT starts to drop below the (2-2)-th reference voltage VRF22, and the second recovery current Irec2 may be supplied to the output node OND. Here, the first auxiliary power transistor Pta1 maintains to be turned on. From t1 to t8, it may be identified that the voltage fluctuation range of the output voltage VOUT decreases by the first recovery current Irec1 and the second recovery current Irec2.

Similarly, the third power transistor Pta3 is turned on by the third auxiliary comparative signal XCM3, which transitions to logic low ("L") at the time t8 when the output voltage VOUT starts to drop below the (2-3)-th reference voltage VRF23, and the third recovery current Irec3 may be supplied to the output node OND. Here, the first auxiliary power transistor Pta1, and the second auxiliary power transistor Pta2 maintain to be turned on.

The output voltage VOUT starts to increase at t8 by the first recovery current Irec1 through the third recovery current Irec3. According to the increase of the output voltage VOUT, the third auxiliary comparative signal XCM3, the second auxiliary comparative signal XCM2, and the first auxiliary comparative signal XCM1 may respectively transition to logic high ("H") at t9, t10, and t11, in order. In this regard, the third recovery current Irec3, the second recovery current Irec2, and the first recovery current Irec1 may be stopped from being respectively supplied to the output node OND at t9, t10, and t11, in order. At t12, when the output voltage VOUT is recovered to a voltage level between the (1-1)-th reference voltage VRF11 and the (1-2)-th reference voltage VRF12, the power transistor PT and the first auxiliary power transistor Pta1 through the third auxiliary power transistor Pta3 may be all turned off.

FIG. 15 illustrates that a ripple phenomenon is slightly generated at the time when the first auxiliary power transistor Pta1 through the third auxiliary power transistor Pta3 are switched in the embodiment shown in pattern ②. Accordingly, the corresponding ripple may be reduced or removed through optimization in circuit design or operation control.

Next, in the embodiment shown in pattern ③ where the voltage recovery unit 150 is operated only as high pass filter HPF, the gating signal XGT is set to be lower by a degree than the negative of the input voltage −VIN through the AC coupling from t1, when the output voltage VOUT starts to drop below the first reference voltage VRF1, and thus, the driving capability of the power transistor PT may be increased. In this case, it may not relieve the fluctuation range by the recovery current Irec. In some cases the fluctuation range of the output voltage VOUT is decreased compared to pattern ①.

Accordingly, in the LDO regulator 100 according to an embodiment of the present disclosure, the recovery current Irec is further supplied to the output node OND, in addition to the driving current Idrv by the power transistor PT, when the output voltage VOUT fluctuates so that the output voltage VOUT may be rapidly recovered to a required voltage level.

Figure 16:
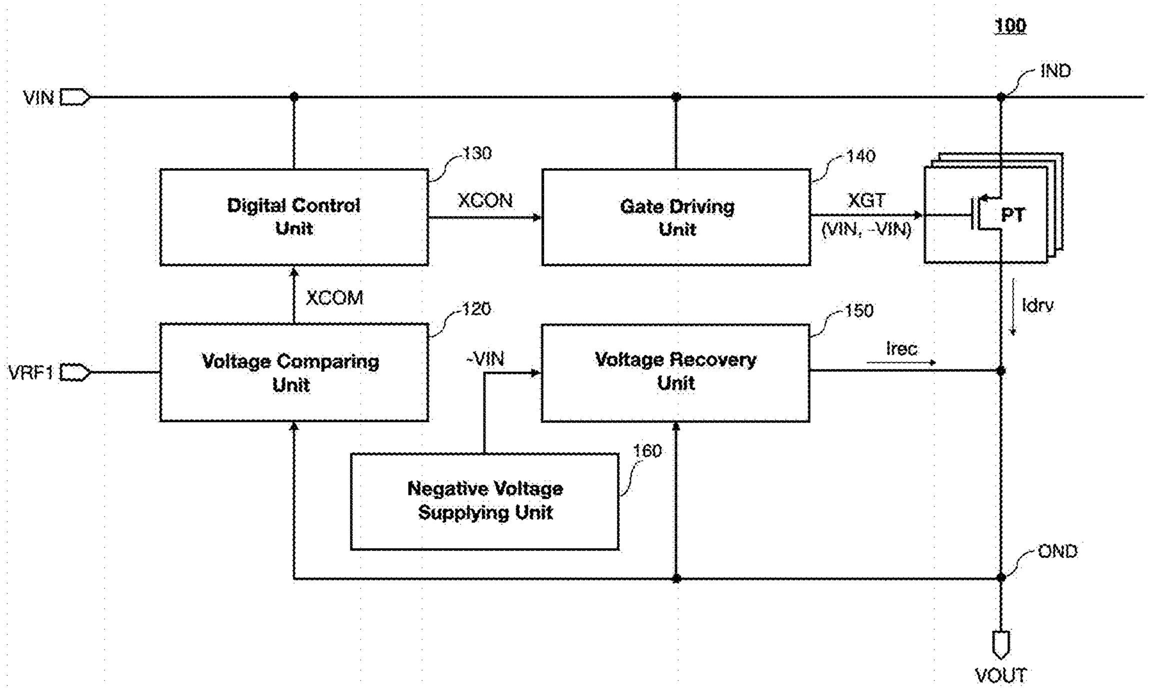
FIGS. 16 and 17 respectively illustrate an LDO regulator according to an embodiment of the present disclosure.

FIG. 16 illustrates the LDO regulator 100 according to an embodiment of the present disclosure.

Referring to FIG. 16, the LDO regulator 100 according to an embodiment of the present disclosure may further include a negative voltage supplying unit 160 for supplying the negative of the input voltage −VIN to the voltage recovery unit 150.

The structure of the negative voltage supplying unit 160 may be the same as or similar to a leakage current compensation unit 170, which will be described below. Hereinafter, the leakage current compensation unit 170 will be described before the negative voltage supplying unit 160.

Figure 17:
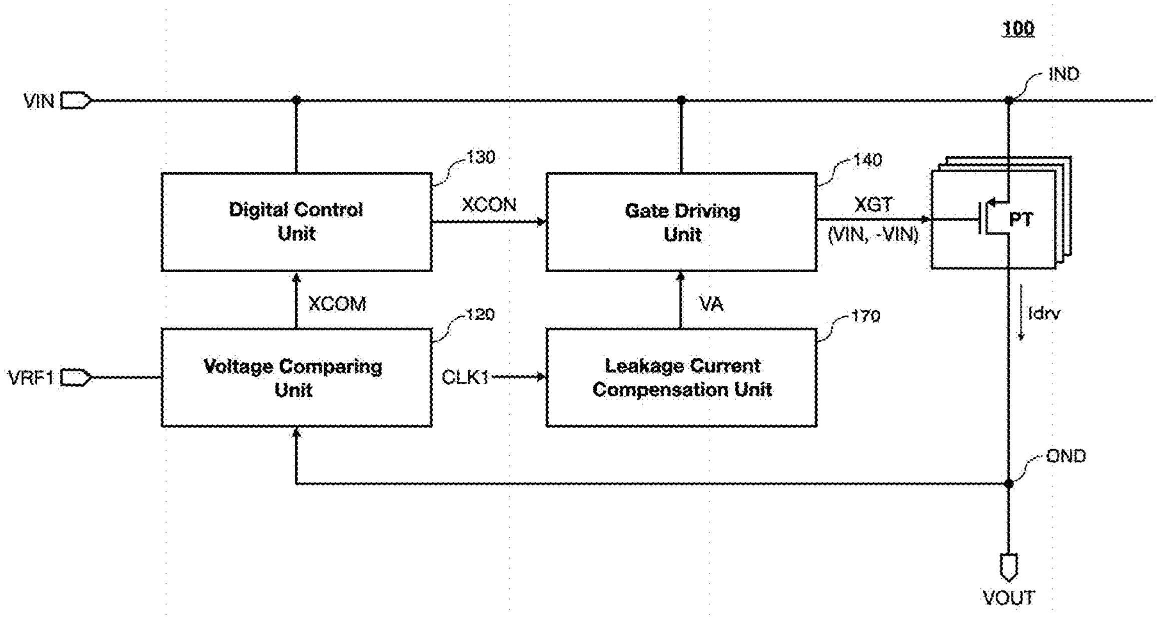
Figure 18:
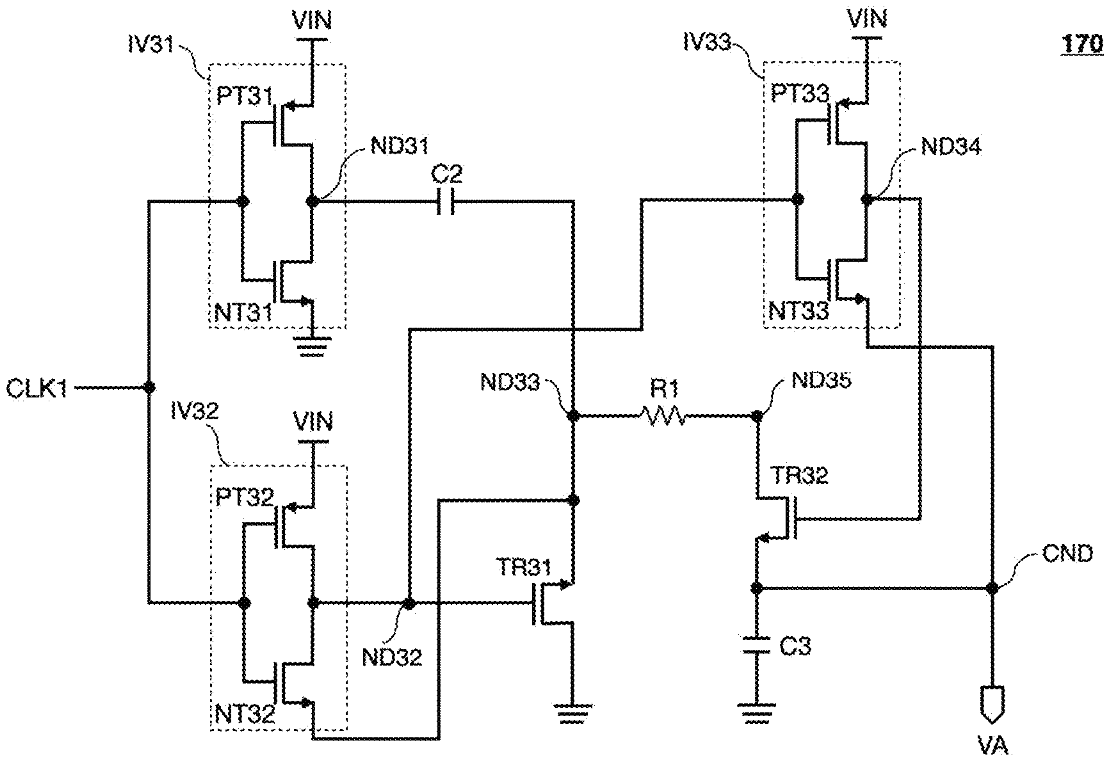
FIG. 18 illustrates a leakage current compensation unit according to an embodiment of the present disclosure.

FIG. 17 illustrates the LDO regulator 100 according to an embodiment of the present disclosure and FIG. 18 illustrates the leakage current compensation unit 170 according to an embodiment of the present disclosure.

Referring to FIGS. 17 and 18, the LDO regulator 100 according to an embodiment of the present disclosure may further include the leakage current compensation unit 170. The leakage current compensation unit 170 may apply a compensation voltage VA to the driving unit 140, in response to a first clock signal CLK1. For example, the leakage current compensation unit 170 may apply the compensation voltage VA for compensating a leakage current for the negative of the input voltage −VIN to the third node ND3 of FIG. 7.

The leakage current compensation unit 170 may include a first compensation inverter IV31 through a third compensation inverter IV33, a second capacitor C2, a third capacitor C3, a (3-1)-th transistor TR31, a (3-2)-th transistor TR32, and a first resistor R1.

The first compensation inverter IV31 may include an input terminal, to which the first clock signal CLK1 is applied, may be disposed between the input voltage VIN and a ground voltage, and may include an output terminal connected to a (3-1)-th node ND31. A second compensation inverter IV32 may include an input terminal, to which the first clock signal CLK1 is applied, and may be disposed between the input voltage VIN and a (3-2)-th node ND32. The third compensation inverter IV33 may include an input terminal connected to the (3-2)-th node ND32, may be disposed between the input voltage VIN and a compensation node CND, and may include an output terminal connected to a (3-4)-th node ND34.

The first clock signal CLK1 may be an operating clock of the fine loop including the fine power transistor PTf of FIG. 10. Also, the first clock signal CLK1 may be a clock signal having a frequency lower than an operating clock of the coarse loop where the fine power transistor PTf of FIG. 10 is included.

The second capacitor C2 may be connected between the (3-1)-th node ND31 and a (3-3)-th node ND33. The third capacitor C3 may be connected between the compensation node CND and the ground voltage.

The (3-1)-th transistor TR31 may include a gate connected to the (3-2)-th node ND32 and may be connected between the (3-3)-th node ND33 and the ground voltage. The (3-2)-th transistor TR32 may include a gate connected to the (3-4)-th node ND34 and may be connected between the input voltage VIN and the compensation node CND. The (3-1)-th transistor TR31 and the (3-2)-th transistor TR32 may be the NMOS transistors.

The first resistor R1 may be disposed between the (3-3)-th node ND33 and a (3-5)-th node ND35. The first resistor R1 may be selectively included to reduce effects occurring due to switching of phases, while the leakage current compensation unit 170 repeatedly performs the following operations of FIGS. 19 and 20 according to the first clock signal CLK1. For example, the first resistor R1 may be included to relieve a temporary and sharp current change, which may be caused when a phase of FIG. 19 (hereinafter, referred to as "phase 1") is switched to a phase of FIG. 20 (hereinafter, referred to as "phase 2") or the phase 2 is switched to the phase 1 in the leakage current compensation unit 170. Here, the first resistor R1 may have a small size to reduce the effects of the voltage drop by the first resistor R1.

Figure 19:
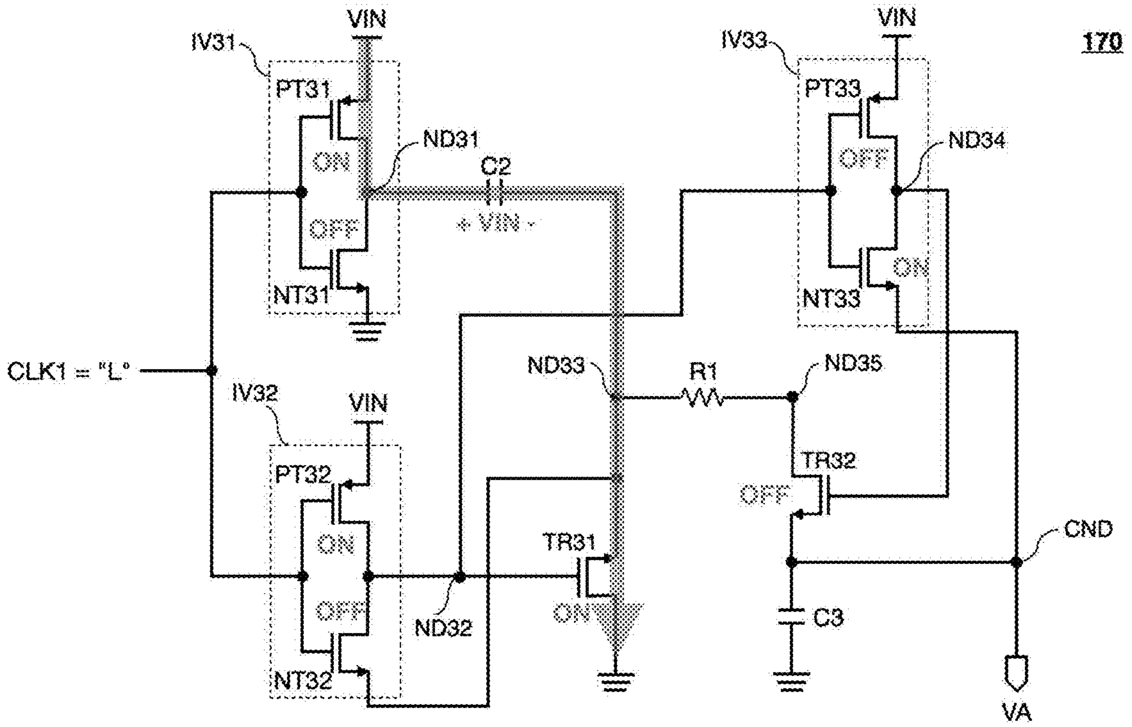
FIGS. 19 and 20 respectively illustrate operations of a leakage current compensation unit according to an embodiment of the present disclosure.
Figure 20:
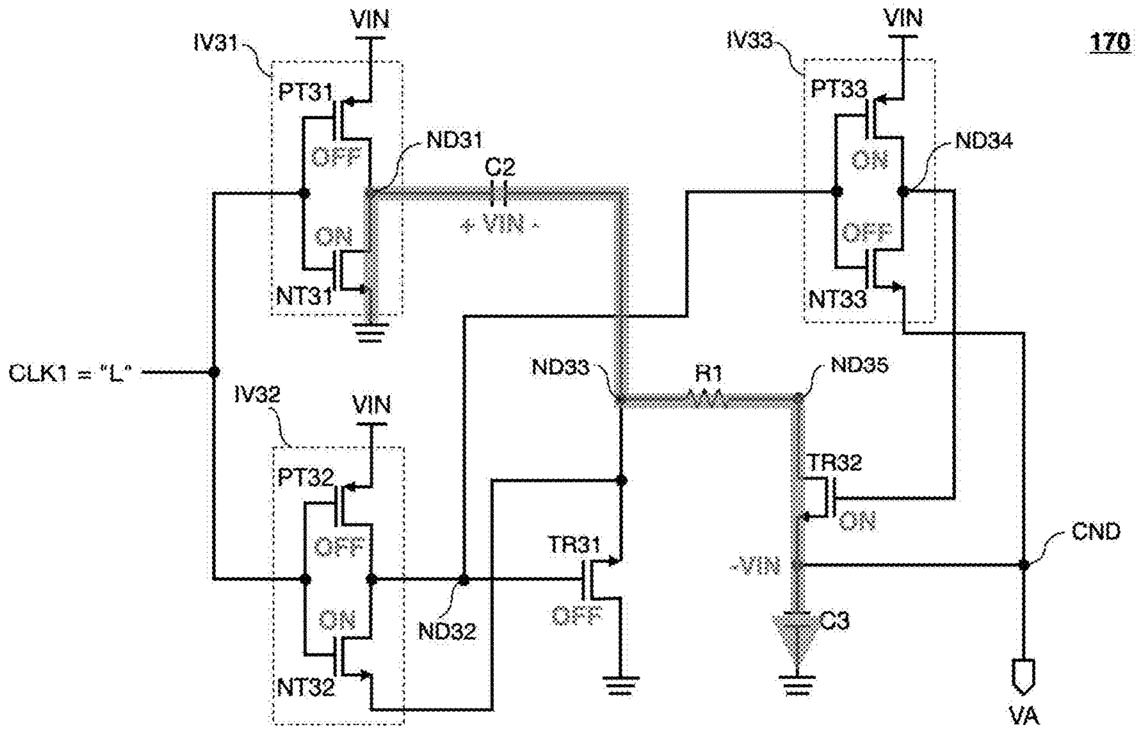

FIGS. 19 and 20 respectively illustrate operations of the leakage current compensation unit 170 according to an embodiment of the present disclosure.

First, referring to FIG. 19, the leakage current compensation unit 170 according to an embodiment of the present disclosure may generate the negative of the input voltage −VIN at the section, where the first clock signal CLK1 is logic low ("L"), that is, at phase 1.

For example, a (3-1)-th PMOS transistor PT31 and a (3-2)-th PMOS transistor PT32 are turned on and a (3-1)-th NMOS transistor NT31 and a (3-2)-th NMOS transistor NT32 are turned off. The (3-1)-th PMOS transistor PT31 and a (3-2)-th PMOS transistor PT32 respectively included in the first compensation inverter IV31 and the second compensation inverter IV32, where the first clock signal CLK1 is applied to the input terminals thereof, respectively. Accordingly, the input voltage VIN is applied to the (3-1)-th node ND31 and the (3-2)-th node ND32.

The (3-1)-th transistor TR31, which is an NMOS transistor, is turned on by the input voltage VIN of the (3-2)-th node ND32 and thus, the ground voltage is applied to the (3-3)-th node ND33. Accordingly, the second capacitor C2 is charged with the input voltage VIN connected between the (3-1)-th node ND31 and the (3-3)-th node ND33.

A (3-3)-th PMOS transistor PT33 and a (3-3)-th NMOS transistor NT33 included in the third compensation inverter IV33 are respectively turned off and turned on by the input voltage VIN of the (3-2)-th node ND32. Thus, the (3-2)-th transistor TR32, which is an NMOS transistor gated by the voltage of the (3-4)-th node ND34, is turned off.

While the leakage current compensation unit 170 is stable, the negative of the input voltage −VIN charged in the third capacitor C3 at the section, where the first clock signal CLK1 is logic high ("H"), may be output as the compensation voltage VA at the section, where the first clock signal CLK1 is logic low ("L").

Next, referring to FIG. 20, in the leakage current compensation unit 170 according to an embodiment of the present disclosure, the voltage level at the compensation node CND, that is, the voltage level of the compensation voltage VA, may be maintained as the negative of the input voltage −VIN generated at the section, where the first clock signal CLK1 is logic low ("L"), at the section where the first clock signal CLK1 is logic high ("H"), that is, at the phase 2.

For example, when the first clock signal (CLK1) is applied to the input terminals of the (3-1)-th PMOS transistor PT31 and the (3-2)-th PMOS transistor PT32 included in the first compensation inverter IV31 and the second compensation inverter IV32, respectively, these transistors are turned off and the (3-1)-th NMOS transistor NT31 and the (3-2)-th NMOS transistor NT32 are turned on. Also, the (3-1)-th transistor TR31, which is an NMOS transistor gated by the voltage of the (3-2)-th node ND32, and the (3-1)-th NMOS transistor NT31 of the third compensation inverter IV33 are turned on. The (3-2)-th transistor TR32, which is an NMOS transistor gated by the voltage of the (3-4)-th node ND34, is also turned on.

Accordingly, the negative of the input voltage −VIN is charged in the third capacitor C3. As described above, the voltage drop of the first resistor R1 may be negligible.

Referring back to FIGS. 17 and 18, operations of the phase 1 and the phase 2 are repeatedly performed after being synchronized with the first clock signal CLK1 having a frequency so that the compensation voltage VA may be applied to the gate driving unit 140 as the negative of the input voltage −VIN having some ripple generated due to switching of the phase 1 and the phase 2. As described above, as the compensation voltage VA is applied to the third node ND3 of the gate driving unit 140 illustrated in FIG. 7, the voltage fluctuation of the negative of the input voltage −VIN occurring due to a leakage current as time passes may be compensated.

Accordingly, in the LDO regulator 100 according to an embodiment of the present disclosure, the power transistors PT may be operated with a sufficient current driving capability at a required level by the negative of the input voltage −VIN.

Referring to FIGS. 16 and 18, the negative voltage supplying unit 160 may have the same or similar structure and perform the same or similar operations as those of the leakage current compensation unit 170, as described above. An output node of the negative voltage supplying unit 160 (corresponding to the compensation node CND of the leakage current compensation unit 170) may be connected to the auxiliary comparator ACP of FIG. 13.

Here, the negative voltage supplying unit 160 of FIG. 16 is operated with a clock signal, that is faster than the first clock signal CLK1, and may include a greater capacitor than the second capacitor C2, and the third capacitor C3. For example, when the first clock signal CLK1 of the leakage current compensation unit 170 is 1 MHz, the negative voltage supplying unit 160 may be 10 MHz. Also, when the second capacitor C2 and the third capacitor C3 of the leakage current compensation unit 170 are respectively 20 pF, the negative voltage supplying unit 160 may be 20 pF.

This is because the fluctuation range of the current is not relatively wide in the leakage current compensation unit 170 due to the compensation for a leakage current in the gate driving unit, whereas the fluctuation range of the current used in operating the auxiliary comparator ACP is relatively wide in the negative voltage supplying unit 160 as illustrated in FIG. 13.

Figure 21:
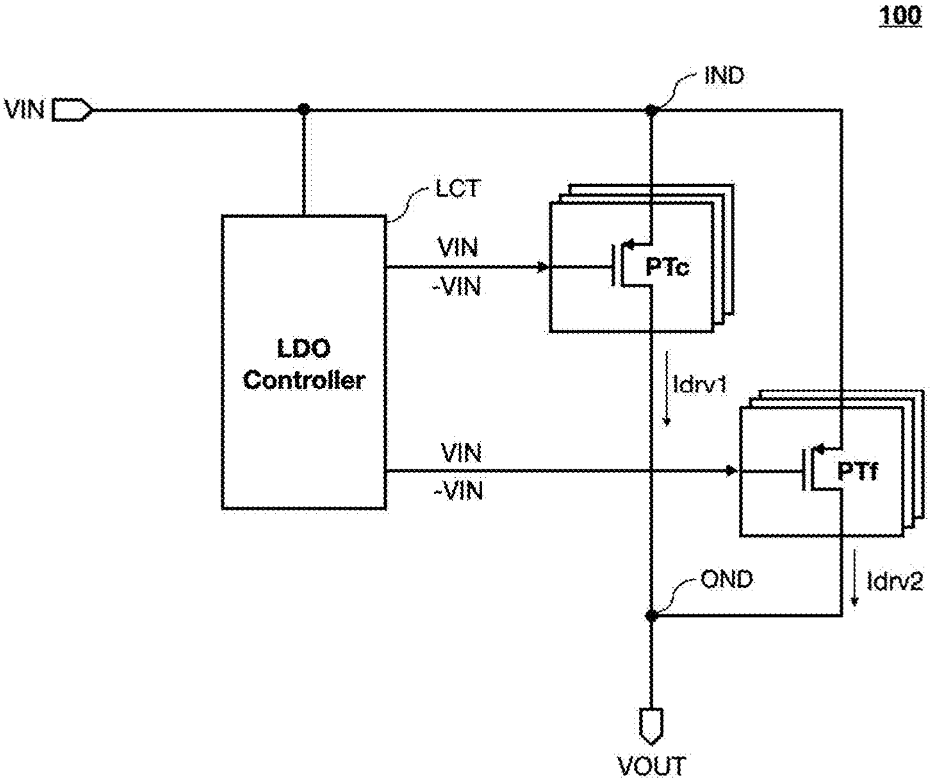
FIGS. 21 through 23 respectively illustrate an LDO regulator according to an embodiment of the present disclosure.
Figure 22:
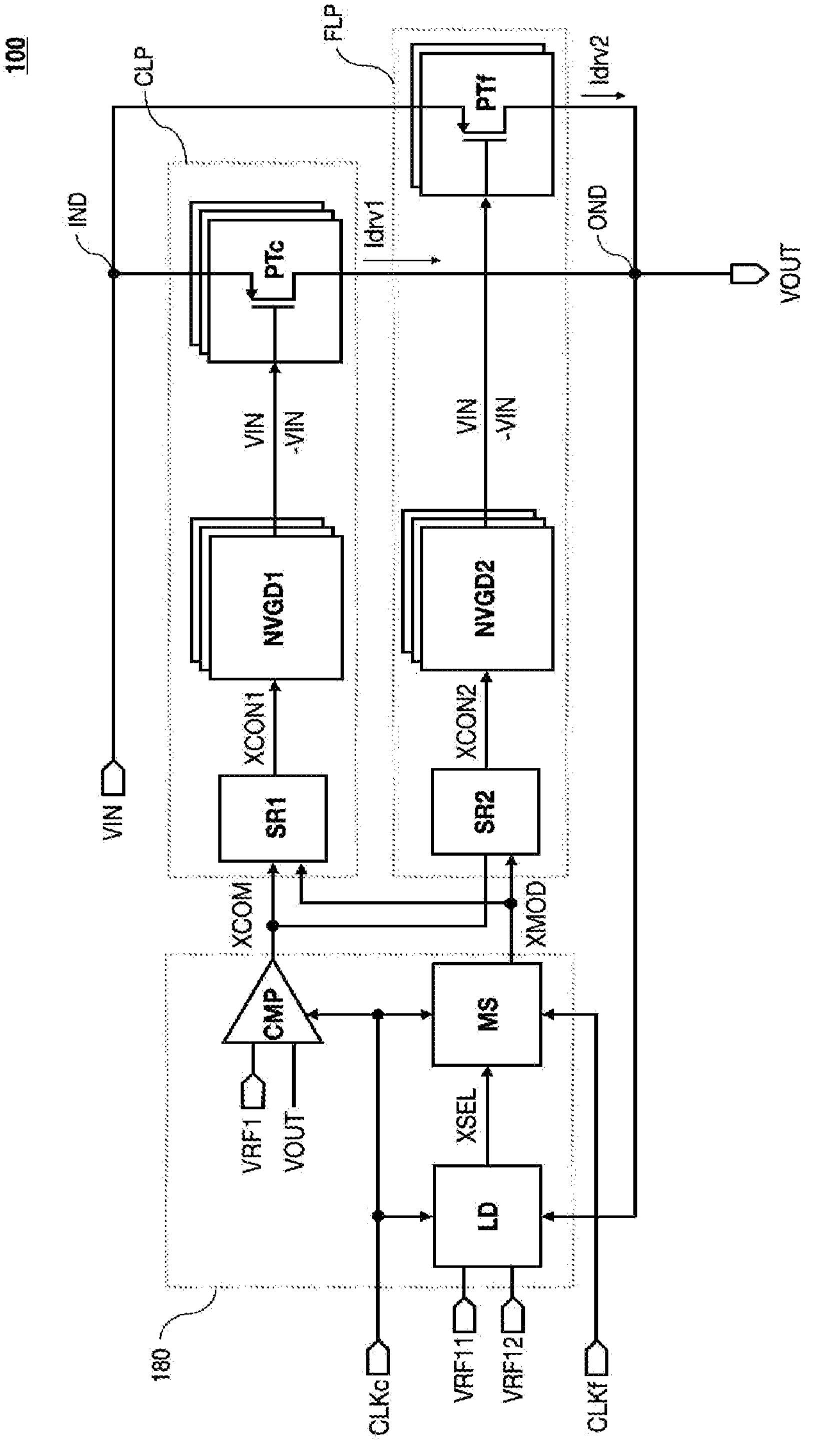
Figure 23:
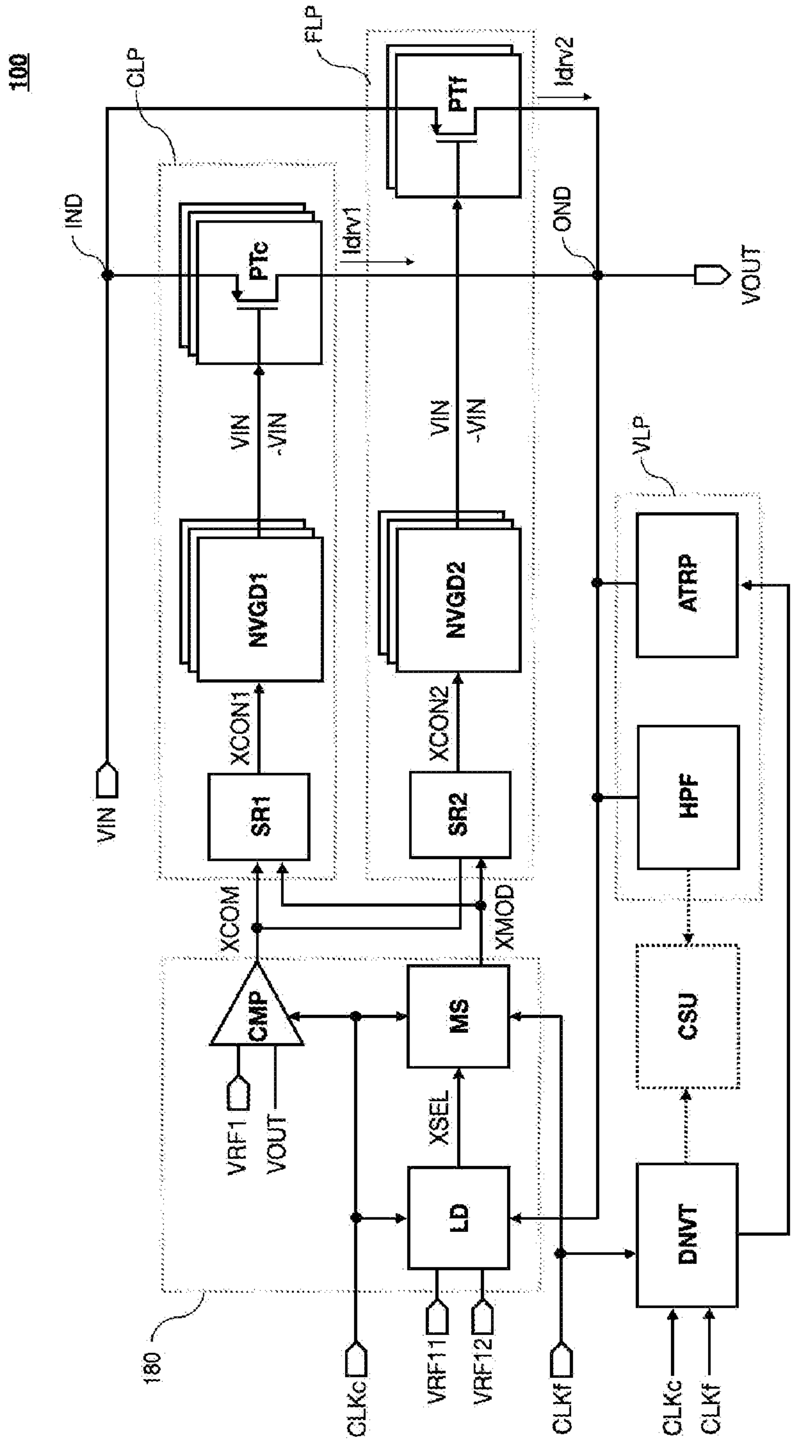

FIGS. 21 through 23 respectively illustrate the LDO regulator 100 according to an embodiment of the present disclosure.

Referring to FIG. 21, the LDO regulator 100 according to an embodiment of the present disclosure may include a plurality of coarse power transistors PTc, a plurality of fine power transistors PTf, and an LDO controller LCT.

The coarse power transistors PTc and the fine power transistors PTf may be each connected between the input node IND and the output node OND. The output voltage VOUT of the output node OND may be regulated within the first voltage range by the coarse power transistor PTc. The output voltage VOUT may be regulated within the second voltage range, which is narrower than the first voltage range, by the fine power transistor PTf. The coarse power transistor PTc and the fine power transistor PTf may respectively supply the first driving current Idrv1 and the second driving current Idrv2 to the output node OND.

The LDO controller LCT may apply one of the input voltage VIN and the negative of the input voltage −VIN to the coarse power transistor PTc or the plurality of fine power transistors PTf. The coarse power transistor PTc or the plurality of fine power transistors PTf may be gated by one of the input voltage VIN and the negative of the input voltage −VIN.

The operation of the LDO controller LCT may be different from the voltage comparing unit 120, and is not limited thereto. For example, the digital control unit 130, and the gate driving unit 140 of FIG. 10. For example, unlike the gate driving unit 140 of FIG. 10, the LDO controller LCT may not directly generate the negative of the input voltage −VIN, may generate the negative of the input voltage −VIN from other outside or inside logic, and then, may apply the generated negative of the input voltage −VIN to the coarse power transistor PTc or the fine power transistor PTf.

Next, referring to FIG. 22, the LDO regulator 100 according to an embodiment of the present disclosure may include a coarse loop CLP, a fine loop FLP, and a loop selection unit 180. Here, it may be understood that the loop selection unit 180 may be entirely or partly included in the coarse loop CLP or the fine loop FLP according to the meaning of the word, loop. The loop selection unit 180, which may be a part of or common to both coarse loop CLP and fine loop FLP, is described as a separate component from the coarse loop CLP and the fine loop FLP.

The coarse loop CLP may include a first shift resistor SR1 and a first negative voltage gate driver NVGD1 with a plurality of coarse power transistor PTc connected between the input node IND and the output node OND, wherein the first shift resistor SR1 generates a first control signal XCON1, in response to the comparative signal XCOM, and the first negative voltage gate driver NVGD1 applies a gating voltage of the coarse power transistor PTc, in response to the first control signal XCON1. The fine loop FLP may include a second shift resistor SR2 and a second negative voltage gate driver NVGD2 with a plurality of fine power transistors PTf connected between the input node IND and the output node OND, wherein the second shift resistor SR2 generates a second control signal XCON2, in response to the comparative signal XCOM, and the second negative voltage gate driver NVGD2 applies a gating voltage of the fine power transistor PTf, in response to the second control signal XCON2.

The first negative voltage gate driver NVGD1 and the second negative voltage gate driver NVGD2 may be respectively the same as the coarse gate driving unit 141 and the fine gate driving unit 143 illustrated in FIG. 7.

The loop selection unit 180 includes a comparator CMP, a load director LD, and a mode selection unit MS and may select or activate one of the coarse loop CLP and the fine loop FLP.

The comparator CMP may correspond to the voltage comparing unit 120 of FIG. 1. The comparator CMP may be operated by being synchronized with a coarse clock signal CKLc, which is an operating clock of the coarse loop CLP.

The load director LD may output the selection signal XSEL based on the voltage level of the output node OND as the (1-1)-th reference voltage VRF11 and the (1-2)-th reference voltage VRF12. The (1-1)-th reference voltage VRF11 and the (1-2)-th reference voltage VRF12 may be the same as those of FIG. 15.

The mode selection unit MS may generate a mode signal XMOD for ordering activation of one of the coarse loop CLP and the fine loop FLP, in response to the selection signal XSEL. The mode selection unit MS may transmit the mode signal XMOD to the first shift resistor SR1 by being synchronized with the coarse clock signal CKLc or by being synchronized with a fine clock signal CKLf, which is an operating clock of the fine loop FLP. The period of the coarse clock signal CKLc may be faster than that of the fine clock signal CKLf. For example, when the coarse clock signal CKLc is 10 MHz, the fine clock signal CKLf may be 1 MHz.

The first negative voltage gate driver NVGD1, the second negative voltage gate driver NVGD2, and the loop selection unit 180 may be included in the LDO controller LCT of FIG. 21.

Next, referring to FIG. 23, the LDO regulator 100 according to an embodiment of the present disclosure may further include a voltage recovery loop VLP. The voltage recovery loop VLP may include an adaptive transient recovery path ATRP and/or the high pass filter HPF.

When the output voltage VOUT at the output node OND varies above the first fluctuation range, the adaptive transient recovery path ATRP supplies a recovery current to the output node OND and may regulate the range of fluctuation of the output voltage VOUT to be within the second fluctuation range which is narrower than the first fluctuation range. The structure and operation of the adaptive transient recovery path ATRP of FIG. 23 may be the same as or similar to the voltage recovery unit 150 of FIG. 12.

The high pass filter HPF includes the input terminal connected to the output node OND and the output terminal connected to the third node ND3 of FIG. 7 of the first negative voltage gate driver NVGD1 and/or the second negative voltage gate driver NVGD2 and may drop the voltage level of the negative of the input voltage −VIN applied to the corresponding power transistor PT. The structure and operation of the high pass filter HPF of FIG. 23 may be the same as or similar to the high pass filter HPF of FIG. 14.

Furthermore, the LDO regulator 100 according to an embodiment of the present disclosure may further include a dual negative voltage tank DNVT for supplying the negative of the input voltage −VIN to the adaptive transient recovery path ATRP or maintaining the voltage level of the negative of the input voltage −VIN applied to the gate of the coarse power transistor PTc in the coarse loop CLP or the fine power transistor PTf in the fine loop FLP. The structure and operation of the dual negative voltage tank DNVT may be the same as or similar to the structure and operation including the negative voltage supplying unit 160 of FIG. 16 and the leakage current compensation unit 170 of FIG. 17.

As described above, the number of the first negative voltage gate driver NVGD1 and the second negative voltage gate driver NVGD2 may respectively correspond to the number of coarse power transistors PTc and fine power transistors PTf. Here, a compensation switching unit CSU may be further included, wherein the compensation switching unit CSU electrically connects the dual negative voltage tank DNVT to the negative voltage gate driver, in which compensation of a leakage current for the negative of the input voltage −VIN is required, from the first negative voltage gate driver NVGD1 and the second negative voltage gate driver NVGD2.

The compensation switching unit CSU may include the number of switches that corresponds to the number of the first negative voltage gate driver NVGD1 and the negative voltage gate driver NVGD2. The third node ND3 (in FIG. 7) of the corresponding negative voltage gate driver and the compensation node CND (in FIG. 18) of the dual negative voltage tank DNVT may be electrically connected or electrically opened by each switch. Accordingly, an unnecessary waste of power may be prevented. Each switch may be switched by a voltage level of the corresponding negative voltage gate driver.

When the compensation switching unit CSU is included, the output terminal of the high pass filter HPF may be electrically connected to a node of the compensation switching unit CSU connected to the compensation node CND (in FIG. 18) of the dual negative voltage tank DNVT, instead of the third node ND3 (in FIG. 7) of the first negative voltage gate driver NVGD1 and the second negative voltage gate driver NVGD2. Accordingly, wiring complexity may be reduced, compared to the case where the output terminal of the high pass filter HPF is connected to a plurality of negative voltage gate drivers.

Figure 24:
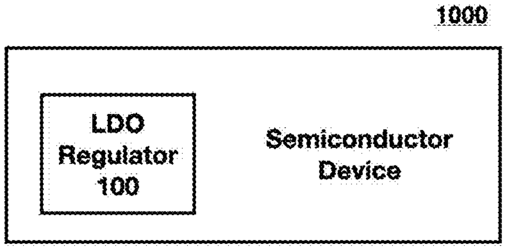
FIG. 24 illustrates a semiconductor device according to an embodiment of the present disclosure.

FIG. 24 illustrates a semiconductor device 1000 according to an embodiment of the present disclosure.

Referring to FIG. 24, the semiconductor device 1000 according to an embodiment of the present disclosure includes the LDO regulator 100 described above. The semiconductor device 1000 may be operated at a constant voltage by the LDO regulator 100 or may further include a power management integrated circuit PMIC for applying the input voltage VIN to the LDO regulator 100. Also, the semiconductor device 1000 may be the integrated circuit of the LDO regulator 100.

According to the LDO regulator and the semiconductor device including the same, a negative of the input voltage is used in gating of the power transistors PT so that the power transistors PT may be normally turned on or a current driving capability of the power transistors PT may be increased in an environment where the LDO regulator needs to be operated at a low input voltage. Accordingly, the LDO regulator may be stably operated.

In addition, according to the LDO regulator and the semiconductor device including the same, a negative input voltage applied to the power transistors PT is generated by using a simple circuit logic and is maintained so that the LDO regulator may be stably operated at a low input voltage and the operations may be performed in a small area or with low power.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A low dropout (LDO) regulator comprising:

one or more power transistors configured to dispose between an input node and an output node, wherein the input node is a node to which an input voltage is applied and the output node is a node from which an output voltage is output;

a voltage comparing unit configured to generate a comparative signal based on a difference between the output voltage and a first reference voltage;

a digital control unit configured to generate a control signal for gating of the one or more power transistors in response to the comparative signal; and a gate driving unit configured to output a gating signal for the one or more power transistors in response to the control signal, wherein the gating signal corresponds to the input voltage in response to a corresponding bit of the control signal having a first logic level and corresponds to a negative of the input voltage in response to the corresponding bit of the control signal having a second logic level different from the first logic level.

2. The LDO regulator of claim 1, wherein the gate driving unit comprises one or more gate drivers, and wherein a number of the one or more gate drivers corresponds to a number of the one or more power transistors.

3. The LDO regulator of claim 1, wherein the gate driving unit comprises:

a first driving path for outputting the input voltage as the gating signal and charging a charging voltage with the input voltage, when the control signal indicates that the corresponding bit has the first logic level; and a second driving path for inverting the charging voltage into the negative of the input voltage and outputting the negative of the input voltage as the gating signal, when the control signal indicates that the corresponding bit has the second logic level.

4. The LDO regulator of claim 1, wherein the gate driving unit comprises:

a voltage applying unit for applying one of the input voltage or a ground voltage to a first node, in response to the control signal;

a voltage inverting unit for inverting the input voltage applied from the first node into the negative of the input voltage and outputting the negative of the input voltage; and a voltage switching unit for outputting the input voltage in response to the corresponding bit of the control signal having the first logic level and the negative of the input voltage in response to the corresponding bit of the control signal having the second logic level, wherein the input voltage is applied from the first node and the negative of the input voltage is from the voltage inverting unit.

5. The LDO regulator of claim 4, wherein the voltage inverting unit comprises:

a charging and inverting circuit, wherein the charging and inverting circuit charges a charging voltage with the input voltage when the input voltage is applied from the first node and inverts the charging voltage when the ground voltage is applied from the first node, and outputs the negative of the input voltage to a third node; and a voltage level holding circuit for holding a voltage level of the negative of the input voltage at the third node as constant.

6. The LDO regulator of claim 1, wherein the gate driving unit comprises:

a first inverter comprising an input terminal, wherein the control signal is applied to the input terminal, and wherein the first inverter outputs one of the input voltage or a ground voltage to an output terminal of a first node;

a first switch connected between the first node and a second node, wherein the first switch is switched in response to the control signal;

a first capacitor connected between the first node and a third node;

a second switch connected between the third node and the second node, wherein the second switch is gated in response to the control signal;

a first transistor connected between the third node and the ground voltage;

a second transistor connected between the input voltage and a gate of the first transistor, wherein the second transistor is gated in response to the control signal; and a third transistor connected between the third node and the gate of the first transistor, wherein the third transistor is gated in response to the control signal.

7. The LDO regulator of claim 1, wherein the one or more power transistors comprise:

a coarse power transistor included in a coarse loop used to regulate the output voltage within a first voltage range; and a fine power transistor included in a fine loop used to regulate the output voltage within a second voltage range, wherein the second voltage range is within the first voltage range.

8. The LDO regulator of claim 7, wherein the gate driving unit comprises:

a coarse gate driving unit for outputting one of the input voltage or the negative of the input voltage as a gating signal of the coarse power transistor; and a fine gate driving unit for outputting one of the input voltage or a ground voltage as a gating signal of the fine power transistor.

9. The LDO regulator of claim 1, further comprising a voltage recovery unit connected to an output node of the one or more power transistors and regulating a range of fluctuation of the output voltage within a second fluctuation range, wherein the second fluctuation range is within a first fluctuation range, and wherein the output voltage varies above the first fluctuation range.

10. The LDO regulator of claim 9, wherein the voltage recovery unit comprises:

at least one auxiliary comparator for each comparing a corresponding second reference voltage with the output voltage of at least one second reference voltages and outputting one of the input voltage or the negative of the input voltage as an auxiliary comparative signal; and at least one auxiliary power transistor for each supplying a recovery current to the output node, in response to the auxiliary comparative signal of the corresponding auxiliary comparator from the at least one auxiliary comparator.

11. The LDO regulator of claim 10, wherein the at least one auxiliary comparator comprises:

a first auxiliary inverter disposed between the corresponding second reference voltage of the at least one second reference voltages and the negative of the input voltage, wherein an input terminal and an output terminal of the first auxiliary inverter are connected at a (2-1)-th node;

a second auxiliary inverter disposed between the output voltage and the negative of the input voltage, wherein an input terminal of the second auxiliary inverter is connected to the output terminal of the first auxiliary inverter;

a third auxiliary inverter disposed between the output voltage and the negative of the input voltage, wherein an input terminal of the third auxiliary inverter is connected to an output terminal of the second auxiliary inverter at a (2-2)-th node; and a fourth auxiliary inverter disposed between the input voltage and the negative of the input voltage, wherein an input terminal of the fourth auxiliary inverter is connected to an output terminal of the third auxiliary inverter at a (2-3)-th node and the auxiliary comparative signal is output to an output terminal of the fourth auxiliary inverter connected to a (2-4)-th node.

12. The LDO regulator of claim 9, wherein the voltage recovery unit further comprises a high pass filter, wherein the high pass filter is connected to the output node and applies a filtering voltage corresponding to the range of fluctuation of the output voltage to the gate driving unit.

13. The LDO regulator of claim 9, further comprising a negative voltage supplying unit for supplying the negative of the input voltage to the voltage recovery unit.

14. The LDO regulator of claim 1, further comprising a leakage current compensation unit for compensating a leakage current for the negative of the input voltage of the gate driving unit, in response to a first clock signal.

15. The LDO regulator of claim 14, wherein the leakage current compensation unit comprises:

a first compensation inverter disposed between the input voltage and a ground voltage, wherein the first compensation inverter includes a first input terminal and an output terminal connected to a (3-1)-th node, and wherein the first clock signal is applied to the first input terminal;

a second compensation inverter disposed between the input voltage and a (3-2)-th node, wherein the second compensation inverter includes a second input terminal, and wherein the first clock signal is applied to the second input terminal;

a second capacitor connected between the (3-1)-th node and a (3-3)-th node;

a (3-1)-th transistor connected between the (3-3)-th node and the ground voltage, wherein the (3-1)-th transistor includes a gate connected to the (3-2)-th node;

a third compensation inverter disposed between the input voltage and a compensation node, and comprises an output terminal connected to a (3-4)-th node, wherein the third compensation inverter includes a third input terminal connected to the (3-2)-th node;

a first resistor connected between the (3-3)-th node and a (3-5)-th node; and a (3-2)-th transistor disposed between the (3-5)-th node and the compensation node, wherein the (3-2)-th transistor includes a gate connected to the (3-4)-th node.

16. A semiconductor device comprising the low dropout (LDO) regulator of claim 1.

17. A low dropout (LDO) regulator comprising:

a coarse loop for regulating an output voltage of an output node within a first voltage range by controlling gating of one or more coarse power transistors; and a fine loop for regulating the output voltage within a second voltage range which is within the first voltage range by controlling gating of one or more fine power transistors, wherein each of the one or more coarse power transistors and the one or more fine power transistors is controlled by a corresponding one of gating signals, wherein the corresponding one of the gating signals corresponds to an input voltage in response to a corresponding bit of a control signal having a first logic level and corresponds to a negative of the input voltage in response to the corresponding bit of the control signal having a second logic level different from the first logic level.

18. The LDO regulator of claim 17, further comprising, when the output voltage at the output node varies above a first fluctuation range, a voltage recovery loop for supplying a recovery current to the output node and regulating the range of fluctuation of the output voltage to be within a second fluctuation range, wherein the second fluctuation range is within the first fluctuation range.

19. The LDO regulator of claim 17, further comprising a dual negative voltage tank for compensating a leakage current for the negative of the input voltage in the coarse loop or the fine loop or supplying the negative of the input voltage to a voltage recovery loop.

20. The LDO regulator of claim 19, wherein the coarse loop and the fine loop each comprises a plurality of negative voltage gate drivers for applying the negative of the input voltage to a corresponding power transistor from the coarse power transistors and the fine power transistors, and the LDO regulator further comprises a compensation switching unit, wherein the compensation switching unit electrically connects the dual negative voltage tank to the negative voltage gate driver.

* * * * *